(12) United States Patent
Yoshimura

(10) Patent No.: US 12,216,467 B2
(45) Date of Patent: Feb. 4, 2025

(54) SELF-LOCATION ESTIMATION DEVICE, AUTONOMOUS MOBILE BODY, AND SELF-LOCATION ESTIMATION METHOD

(71) Applicant: SONY SEMICONDUCTOR SOLUTIONS CORPORATION, Kanagawa (JP)

(72) Inventor: Shin Yoshimura, Kanagawa (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 266 days.

(21) Appl. No.: 17/754,107

(22) PCT Filed: Sep. 23, 2020

(86) PCT No.: PCT/JP2020/035687
§ 371 (c)(1),
(2) Date: Mar. 24, 2022

(87) PCT Pub. No.: WO2021/065594
PCT Pub. Date: Apr. 8, 2021

(65) Prior Publication Data
US 2022/0291686 A1    Sep. 15, 2022

(30) Foreign Application Priority Data
Oct. 1, 2019    (JP) .................... 2019-181183

(51) Int. Cl.
*G01C 21/34*    (2006.01)
*G01C 21/30*    (2006.01)
(Continued)

(52) U.S. Cl.
CPC ............ *G05D 1/0088* (2013.01); *G01C 21/30* (2013.01); *G05D 1/0246* (2013.01);
(Continued)

(58) Field of Classification Search
CPC ........ G01C 21/30; G05D 1/0246; G06T 7/74; G06T 2207/20081; G06T 2207/30252; G01S 17/89
See application file for complete search history.

(56) References Cited

U.S. PATENT DOCUMENTS

2018/0253861 A1* 9/2018 Moteki ................... G06T 7/174
2020/0013188 A1* 1/2020 Nakashima ............ G06N 3/045

FOREIGN PATENT DOCUMENTS

JP    2007-322138 A    12/2007
JP    2018-185239 A    11/2018
(Continued)

OTHER PUBLICATIONS

Translation of JP 2019197350 (Year: 2018).*
(Continued)

*Primary Examiner* — Kenneth J Malkowski
(74) *Attorney, Agent, or Firm* — CHIP LAW GROUP

(57) ABSTRACT

A self-location estimation device includes a first self-location estimation unit, a second self-location estimation unit, and a first integration unit. The first self-location estimation unit estimates a current first self-location of an autonomous mobile body based on current image information acquired by an image sensor and environmental map information stored in an environmental map information storage unit. The second self-location estimation unit estimates a current second self-location of the autonomous mobile body based on the current image information and a learned parameter learned using the environmental map information. The first integration unit estimates a current self-location of the autonomous mobile body by integrating the first self-location and the second self-location.

11 Claims, 24 Drawing Sheets

(51) Int. Cl.
 G05D 1/00 (2006.01)
 G06T 7/73 (2017.01)
(52) U.S. Cl.
 CPC ......... *G05D 1/0272* (2013.01); *G05D 1/0274* (2013.01); *G06T 7/74* (2017.01); *G06T 2207/20081* (2013.01); *G06T 2207/30252* (2013.01)

(56) References Cited

FOREIGN PATENT DOCUMENTS

| | | |
|---|---|---|
| JP | 2019-007739 A | 1/2019 |
| JP | 2019197350 A * | 11/2019 |
| WO | 2016/139747 A1 | 9/2016 |

OTHER PUBLICATIONS

International Search Report and Written Opinion of PCT Application No. PCT/JP2020/035687, issued on Dec. 8, 2020, 09 pages of ISRWO.

* cited by examiner

SELF-LOCATION ESTIMATION DEVICE, AUTONOMOUS MOBILE BODY, AND SELF-LOCATION ESTIMATION METHOD

CROSS REFERENCE TO RELATED APPLICATIONS

This application is a U.S. National Phase of International Patent Application No. PCT/JP2020/035687 filed on Sep. 23, 2020, which claims priority benefit of Japanese Patent Application No. JP 2019-181183 filed in the Japan Patent Office on Oct. 1, 2019. Each of the above-referenced applications is hereby incorporated herein by reference in its entirety.

FIELD

The present disclosure relates to a self-location estimation device, an autonomous mobile body, a self-location estimation method, and a program.

BACKGROUND

A technique for estimating a self-location of an autonomous mobile body based on image information at each time obtained by imaging surroundings of the autonomous mobile body in time series by an imaging device mounted on the autonomous mobile body is known. For example, in the following Patent Literature 1, a self-location of an autonomous mobile body in a real space is estimated based on a three-dimensional location of a landmark included in each piece of image information at each time specified using a map database that stores feature points of a plurality of collation landmarks associated with the three-dimensional location in the real space, and relative location and posture of the autonomous mobile body with respect to a reference point.

CITATION LIST

Patent Literature

Patent Literature 1: JP 2018-185239A

SUMMARY

Technical Problem

However, in Patent Literature 1 described above, there is a problem that the self-location of the autonomous mobile body cannot be estimated in a case where the autonomous mobile body frequently pauses or an external environment greatly changes. For example, in Patent Literature 1, in a case where the environment greatly changes such as day and night, since an appearance of the landmark on the image greatly changes, it is not possible to collate the collation landmark stored in a map database with the landmark included in the image information, and it is not possible to estimate the self-location of the autonomous mobile body.

Therefore, the present disclosure proposes a self-location estimation device, an autonomous mobile body, a self-location estimation method, and a program capable of estimating a self-location of the autonomous mobile body even in a case where the autonomous mobile body frequently pauses or the external environment greatly changes.

Solution to Problem

In order to solve the above problem, according to an aspect of the present disclosure, there is provided a self-location estimation device comprising: a first self-location estimation device, a second self-location estimation device, and a first integration unit. The first self-location estimation unit estimates current image information acquired by one or more image sensors provided in an autonomous mobile body movable in a real space, environmental map information, and a current first self-location of the autonomous mobile body. The environmental map information is obtained by associating pieces of past image information acquired in the past by the image sensor, one or more feature amounts extracted from the past image information, and pairs of past self-locations at which a location of the autonomous mobile body is estimated at an acquisition time when the image sensor acquires the past image information in plural on a map A second self-location estimation unit estimates a current second self-location of the autonomous mobile body based on the current image information acquired by the image sensor and a learned parameter learned using the environmental map information. The first integration unit estimates a current self-location of the autonomous mobile body by integrating the first self-location and the second self-location.

(Operation)

In the self-location estimation device according to an aspect of the present disclosure, the first self-location estimation unit estimates the first self-location based on the environmental map information and the current image information, and the second self-location estimation unit estimates the second self-location based on the current image information and the learned parameter learned using the environmental map information. Then, since the first integration unit estimates the current self-location of the autonomous mobile body by integrating the first self-location and the second self-location, it is possible to estimate the stable self-location of the autonomous mobile body with high accuracy even in a case where the autonomous mobile body frequently pauses or the external environment greatly changes.

DESCRIPTION OF EMBODIMENTS

Figure 1:
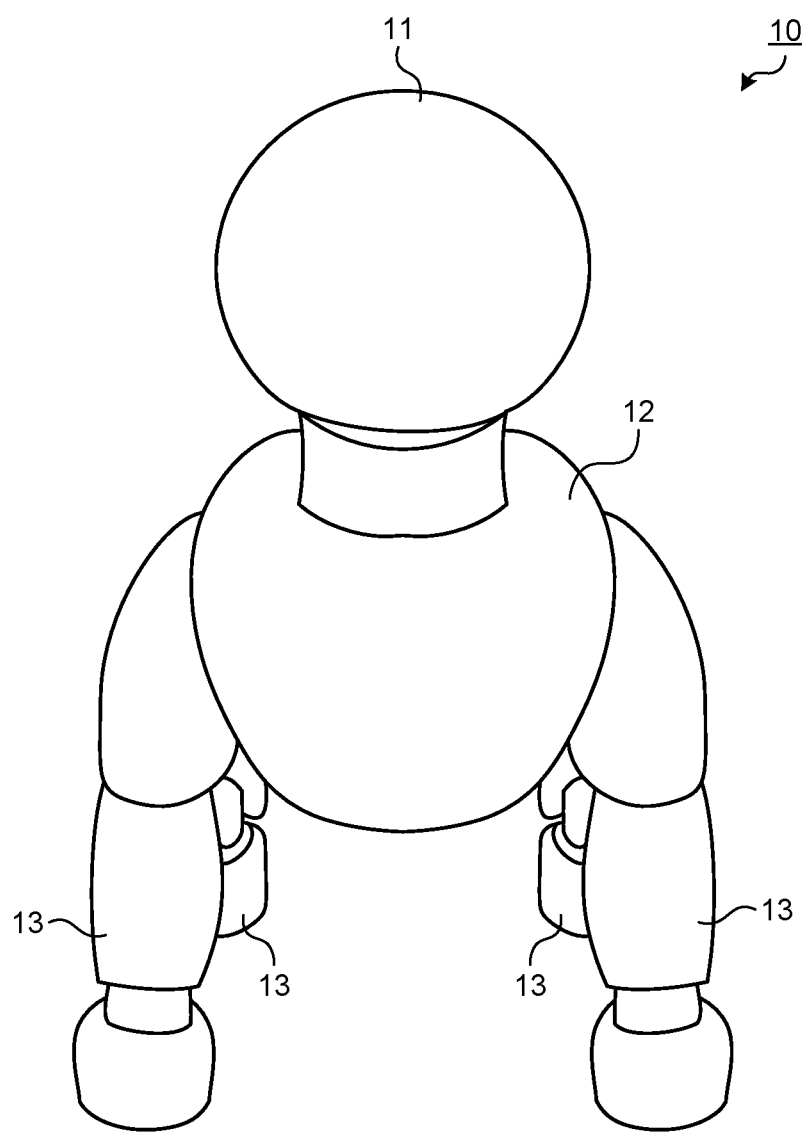
FIG. 1 is a schematic front view of an autonomous mobile body applied to each embodiment of the present disclosure.

Hereinafter, embodiments of the present disclosure will be described in detail with reference to the drawings. In the present specification and the drawings, components having substantially the same functional configuration are denoted by the same reference numerals, and redundant description is omitted.

Note that the description will be given in the following order.
1. Configuration of Autonomous Mobile Body
  1-1. Schematic Configuration of Autonomous Mobile Body
  1-2. Problem of Robot Product for General Household
2. First Embodiment
  2-1. Functional Configuration of Autonomous Mobile Body
  2-2. Functional Configuration of Self-location Estimation Device
    2-2-1. Detailed Configuration of First Self-location Estimation Unit
  2-3. Processing of Autonomous Mobile Body
  2-4. Action and Effect
3. Second embodiment
  3-1. Functional Configuration of Self-location Estimation Device
  3-2. Processing of Self-location Estimation Device
  3-3. Action and Effect
  3-4. Modification of Second Embodiment
  3-5. Action and Effect
4. Third embodiment
  4-1. Functional Configuration of Self-location Estimation Device
  4-2. Action and Effect
  4-3. Modification of Third Embodiment
  4-4. Action and Effect
5. Fourth Embodiment
  5-1. Functional Configuration of Self-location Estimation Device
  5-2. Action and Effect
6. Conclusion

1. CONFIGURATION OF AUTONOMOUS MOBILE BODY

1-1. Schematic Configuration of Autonomous Mobile Body

Figure 2:
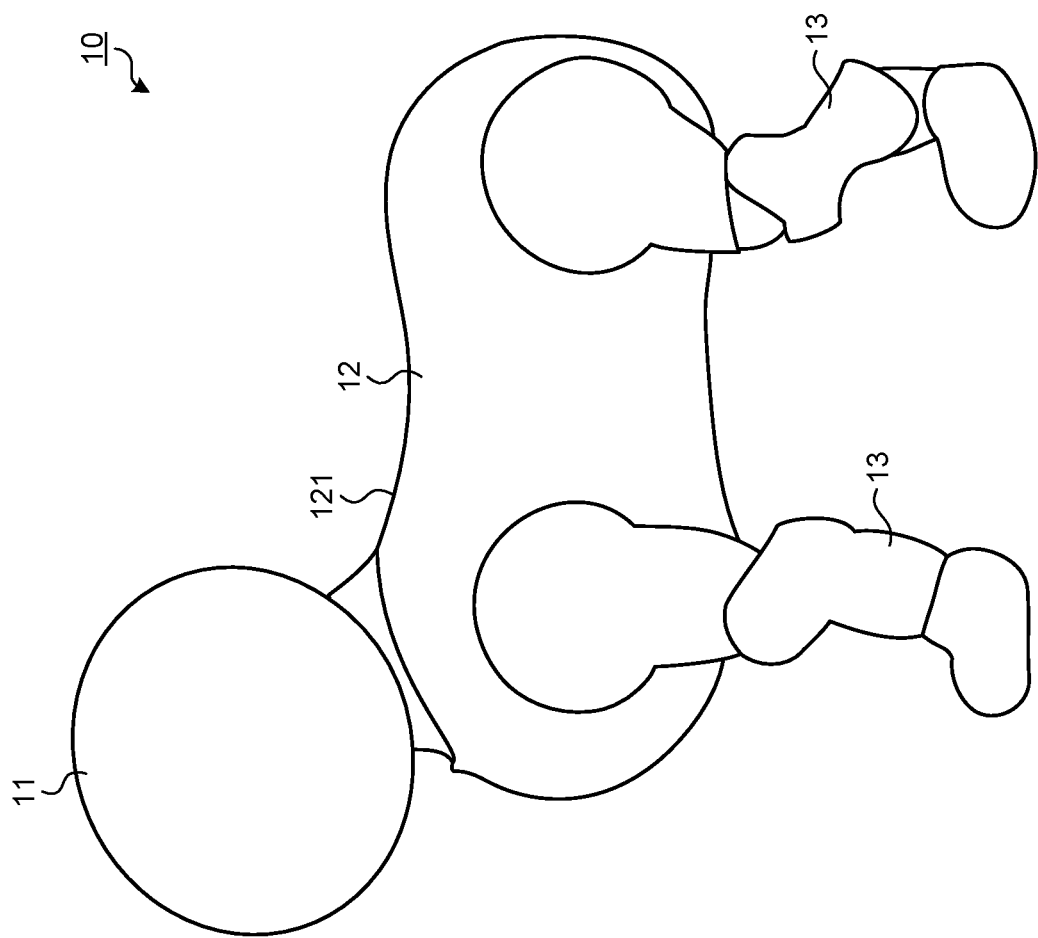
FIG. 2 is a schematic side view of the autonomous mobile body applied to each embodiment of the present disclosure.

FIG. 1 is a schematic front view of an autonomous mobile body applied to each embodiment of the present disclosure. FIG. 2 is a schematic side view of the autonomous mobile body applied to each embodiment of the present disclosure.

The autonomous mobile body 10 illustrated in FIGS. 1 and 2 is a device that can autonomously move using at least one of an electrical action and a magnetic action. Specifically, the autonomous mobile body 10 is a robot (for example, a pet robot) that can move by autonomously walking on the ground. In addition to the robot, the autonomous mobile body 10 may be any device or mobile body that can autonomously move using at least one of an electrical action and a magnetic action. For example, the autonomous mobile body 10 may be other types of robots such as humanoid robots or drones, carriages such as vehicles, trains, ships, and airplanes, medical devices, various industrial machines, toys, and the like.

At the time of action or movement, the autonomous mobile body 10 acts while estimating a self-location while capturing an image. Here, the self-location is a location (absolute location) and posture of the autonomous mobile body with respect to an origin of an activity space (real space).

The autonomous mobile body 10 includes a head portion 11, a body portion 12, and a movement mechanism 13. The autonomous mobile body 10 has a plurality of joints inside one or more of the head portion 11, the body portion 12, and the movement mechanism 13. An actuator is disposed inside each of the plurality of joints. When the actuators are driven under the control of a control unit described later, each of the plurality of joints rotates or turns about a predetermined axis. As a result, the autonomous mobile body 10 performs a target motion. For example, in the autonomous mobile body 10, the head portion 11 rotates about a predetermined axis with respect to the body portion 12 by arranging a neck joint between the head portion 11 and the body portion 12. Further, the autonomous mobile body 10 disposes a hip joint between the body portion 12 and each of the movement mechanisms 13. As a result, the autonomous mobile body 10 can move by each movement mechanism 13 rotating about a predetermined axis with respect to the body portion 12.

1-2. Problem of Robot Product for General Household

A robot product for general household including the autonomous mobile body 10 is always operated, and can estimate a sufficient self-location under conditions that an external environment does not change. However, it is difficult for the robot product for general household to estimate the self-location when the robot products are frequently paused or when the external environment changes greatly every day. For example, in a robot product for general household, when the environment greatly changes such as day and night, an appearance of a landmark illustrated in a captured image greatly changes, and thus, even the same landmark is recognized as different between day and night.

Figure 3:
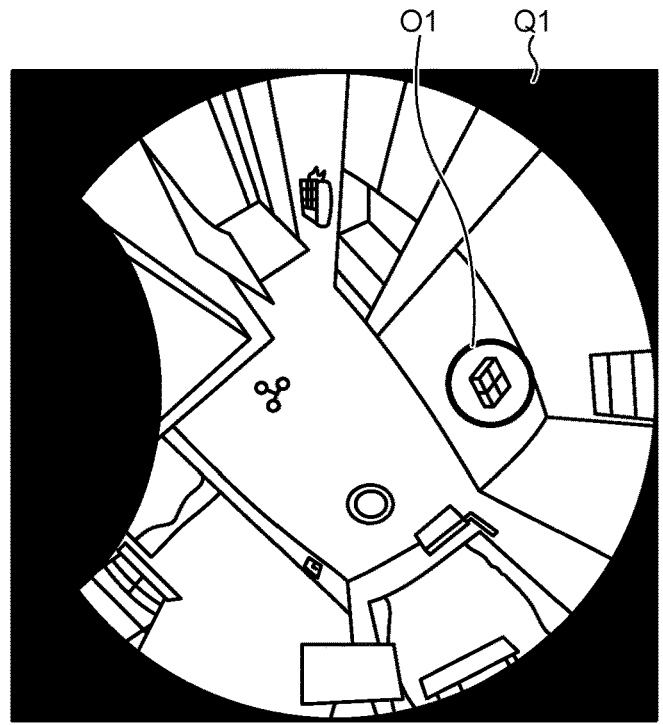
FIG. 3 is a diagram illustrating an example of daytime image information acquired by a robot product for general household.
Figure 4:
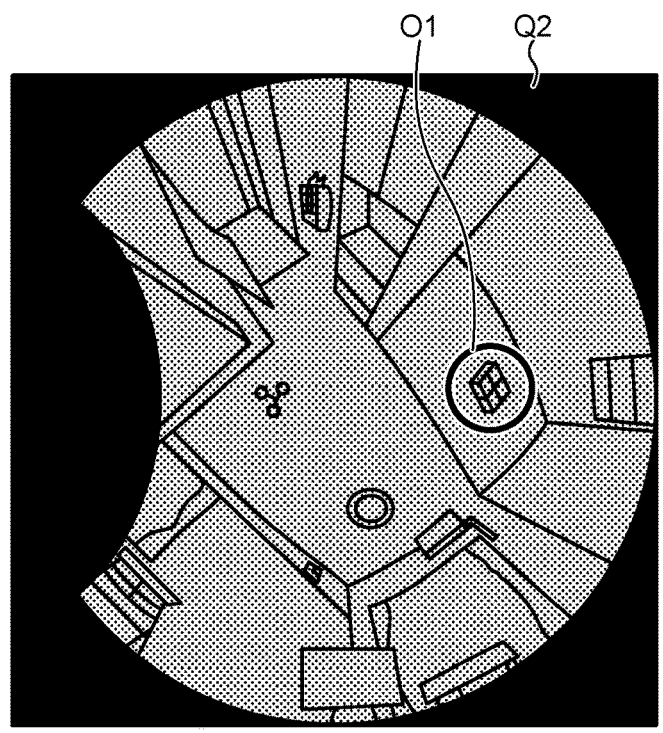
FIG. 4 is a view illustrating an example of night image information acquired by the autonomous mobile body.

FIG. 3 is a diagram illustrating an example of daytime image information acquired by the robot product for general household. FIG. 4 is a diagram illustrating an example of night image information acquired by the autonomous mobile body 10. FIGS. 3 and 4 illustrate image information acquired by the autonomous mobile body 10 in the same space. Note that, in FIG. 4, the situation at night is schematically represented by hatching the whole.

In an image Q1 illustrated in FIG. 3 and an image Q2 illustrated in FIG. 4, a case where attention is paid to an illumination device O1 functioning as a landmark or an object will be described. In this case, the appearance of the illumination device O1 greatly changes between day and night. That is, in the robot product for general household, the illumination device O1 cannot be matched between the day and the night using a known object detection processing technique. Furthermore, in a case where the robot product for general household greatly changes due to movement, deformation, or the like of an object such as a landmark, when a known object detection processing technology is used, a sufficient self-location cannot be estimated using an environmental map created by known simultaneous localization and mapping (SLAM) processing. For this reason, the robot product for general household cannot take correspondence between the landmark associated in the environmental map generated by the image information acquired by the image sensor at daytime and the landmark appearing in the latest image acquired by the image sensor at night. As a result, the robot product for general household cannot estimate a current (latest) self-location with respect to the existing map (problem (1)).

In addition, in order to prevent an increase in manufacturing cost of the robot product for general household, performance of image sensors and the like is optimized. As a result, since an image sensor or the like mounted on the robot product for general household is not high in performance and has low resolution, there is a case where the self-location cannot be estimated based on a detection result of a distance sensor or the like, for example (problem (2)).

Furthermore, the robot product for general household is driven or stopped by being lifted and moved by a user or by frequently performing on operation or off operation by a power button. Furthermore, the robot product for general household is lifted and moved by the user in a stopped state. In this case, the robot product for general household temporarily loses sight of the self-location each time (problem (3)).

In addition to the event of the problem (2) described above, in a case where the robot product for general household loses sight of the self-location due to the problem (3) described above, the robot product has to estimate the self-location based on image information acquired by an image sensor. However, in a case where the robot product for general household loses sight of the self-location, when the surrounding external environment greatly changes, the robot product cannot estimate the self-location due to the above-described problem (1) (problem (4)).

The event of the problem (4) frequently occurs in actual use situations of the robot product for general household. Specifically, in the event of the problem (4), the robot product for general household is in a resting state for a certain period of time triggered by a button operation of a user or for the purpose of autonomous heat release or charging. Further, the event of the problem (4) frequently occurs in a situation where the power is turned off and then the power is returned to the active state again.

Furthermore, the robot product for general household recognizes that even the same space is a different space due to the event of the problem (4) described above (problem (5)).

As a result, the robot product for general household creates a plurality of maps even in the same space each time the environment changes, and performs control based on the map according to the environment each time (problem (6)).

The event of the problem (6) is not preferable in robot control because images originally desired to be aggregated and used on one map are divided into a plurality of maps and scattered. For example, in the robot product for general household, first, in the morning, a location (coordinates) of a charging stand is associated with a map created in a morning environment. Then, the robot product for general household starts from the charging stand. Thereafter, in a case where the robot product for general household is active for one day and returns to the charging stand at night, when the map is switched to the night map, the robot product for general household cannot estimate the self-location based on the acquired image information. As a result, the robot product for general household loses the location of the charging stand, and thus cannot return to the charging stand.

Further, in the event of the problem (6), although there is a sufficient map for living in a certain space, the capacity of the map increases by the number of maps by creating different maps each time. As a result, in the problem (6), the capacity of the storage device of the robot product for general household is squeezed, and a problem that it takes a lot of time to estimate the self-location occurs.

Figure 5:
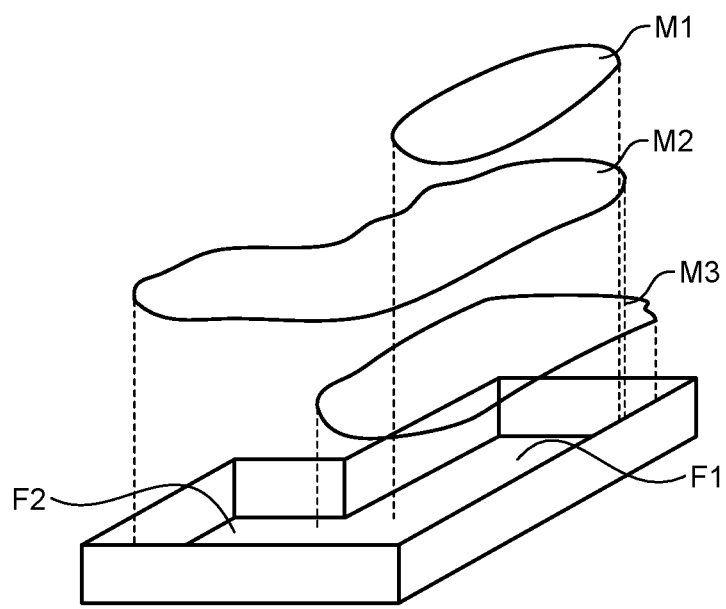
FIG. 5 is a diagram schematically illustrating an example of segmentation of an environmental map.

FIG. 5 is a diagram schematically illustrating an example of segmentation of the environmental map. In FIG. 5, it is assumed that an environment change of a floor F1 is severe. Further, in FIG. 5, a floor F2 will be described assuming that the environment does not change.

As illustrated in FIG. 5, the robot product for general household creates a plurality of different environmental maps in a region where environmental changes are severe.

For example, the robot product for general households creates each of a morning environmental map M1, a daytime environmental map M2, and a night environmental map M3. For this reason, even on the same floor F1, the robot product for general household creates the divided environmental maps M1 to M3.

As described above, in the conventional robot product for general household, there is a problem that the self-location cannot be estimated when the robot product is frequently paused or when the external environment greatly changes.

2. FIRST EMBODIMENT

2-1. Functional Configuration of Autonomous Mobile Body

Figure 6:
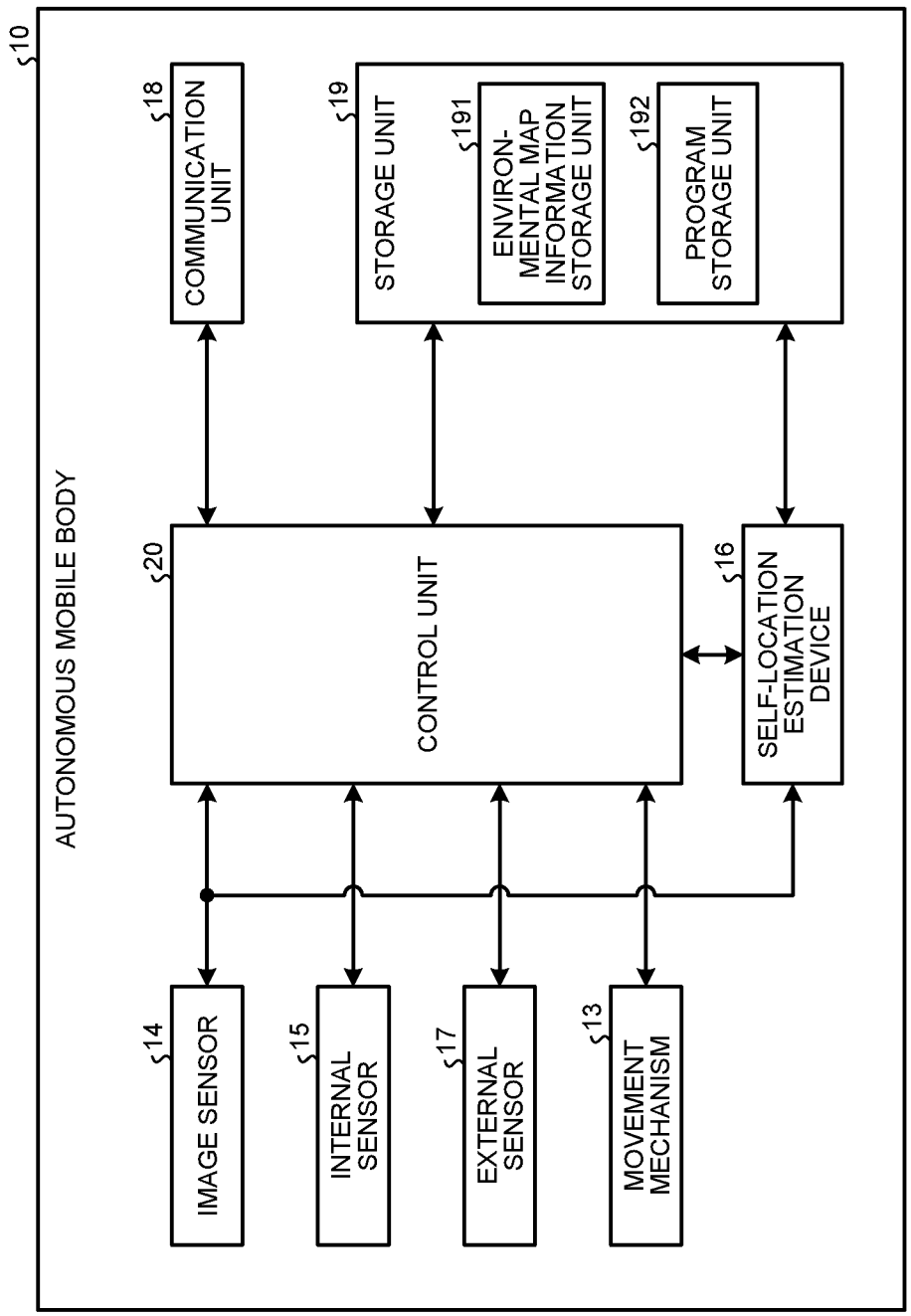
FIG. 6 is a block diagram illustrating a functional configuration of the autonomous mobile body according to the first embodiment of the present disclosure.

Next, a functional configuration of the autonomous mobile body 10 will be described. FIG. 6 is a block diagram illustrating a functional configuration of the autonomous mobile body 10.

As illustrated in FIG. 6, the autonomous mobile body 10 includes a movement mechanism 13, an image sensor 14, an internal sensor 15, a self-location estimation device 16, an external sensor 17, a communication unit 18, a storage unit 19, and a control unit 20.

The movement mechanism 13 is a mechanism for moving the autonomous mobile body 10. Specifically, as illustrated in FIGS. 1 and 2, the movement mechanism 13 includes a plurality of legs for walking, for example, two legs or four legs. The movement mechanism 13 includes one or more actuators. The movement mechanism 13 moves the autonomous mobile body 10 by driving an actuator based on power supplied from a power supply (not illustrated) arranged in the autonomous mobile body 10 under the control of the control unit 20. Note that the number of legs can be appropriately changed. Further, the movement mechanism 13 may include a plurality of wheels or propellers instead of the legs. Furthermore, the movement mechanism 13 may have a configuration including an endless track mechanism.

One or more image sensors 14 are provided in the autonomous mobile body 10. The image sensor 14 is provided at the location of the body portion 12 of the autonomous mobile body 10, and is provided at a back 121 (see FIG. 2) of the body portion 12 capable of capturing a vertical direction in a real space, for example, a ceiling, eyes of a head portion 11 of the autonomous mobile body 10, and the like. Under the control of the control unit 20, the image sensor 14 generates image information by imaging a predetermined field of view, and outputs the image information to the control unit 20 and the self-location estimation device 16. The image sensor 14 includes an optical system and an image sensor. The optical system includes one or a plurality of lenses, and forms a subject image on a light receiving surface of the image sensor. The optical system of the image sensor 14 is preferably a fisheye optical system, and may be either circumferential fisheye optics or diagonal fisheye optics. The image sensor includes a charge coupled device (CCD), a complementary metal oxide semiconductor (CMOS), or the like, and generates image information by receiving a subject image formed by the optical system.

Figure 7:
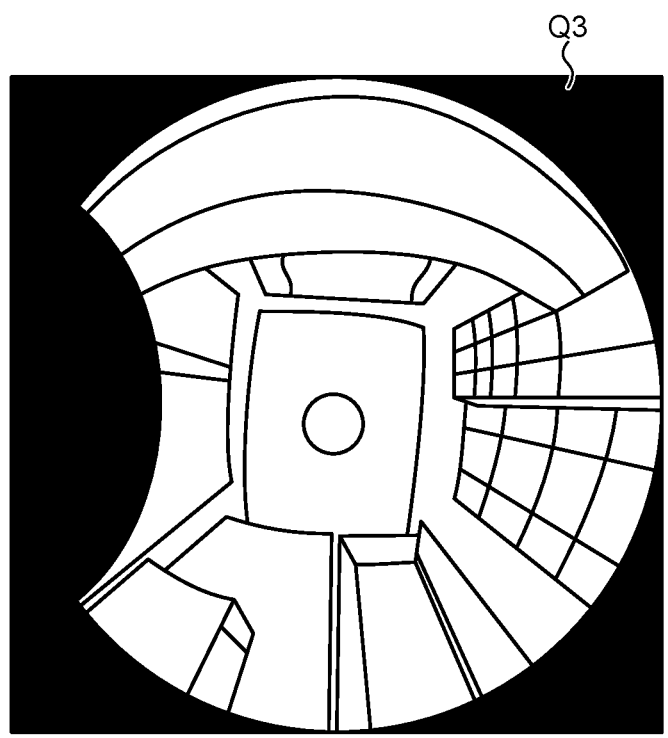
FIG. 7 is a view illustrating an example of an image acquired by an image sensor according to the first embodiment of the present disclosure.

FIG. 7 is a diagram illustrating an example of an image acquired by the image sensor 14. As illustrated in FIG. 7, for example, in a case where the image sensor 14 is provided on the back 121 of the body portion 12 capable of photographing the ceiling, the image sensor can acquire an image Q3. The Image Q3 is an example of an image of an indoor space of a general household. Note that an angle of view of the image sensor 14 is desirably wide in order to acquire a large amount of information in one photographing. Furthermore, a method of mounting the image sensor 14 on the autonomous mobile body 10 may be provided by being mounted in a state of being fixed in one direction, or may be provided by being mounted on a movable portion having a high degree of freedom such as a joint, for example. Note that, in a case where the image sensor 14 is attached ahead of the movable portion, the posture of the image sensor 14 with respect to a coordinate system based on a traveling direction of the autonomous mobile body 10 may be calculated from the state of the movable portion. Furthermore, the image sensor 14 uses at least one of visible light and infrared light (IR light) as light in a wavelength band to be acquired. Furthermore, the image sensor 14 may be distance image information or depth information obtained from infrared light by active irradiation. Furthermore, the image sensor 14 acquires image information according to a predetermined frame rate (fps) under the control of the control unit 20. Note that the frame rate can be appropriately changed.

The internal sensor 15 measures internal information on the autonomous mobile body 10. Here, the internal information includes at least one or more of a speed of the autonomous mobile body 10, an acceleration of the autonomous mobile body 10, a relative location of the autonomous mobile body 10, and an angular velocity of the autonomous mobile body 10. Furthermore, in a case where the autonomous mobile body 10 has one or more joints, the internal information includes at least one or more of a rotation angle of each joint and a rotation speed of each joint in the autonomous mobile body 10. The internal sensor 15 includes at least one or more of a triaxial acceleration sensor, a triaxial gyro sensor, an encoder, a wheel encoder, and the like. In the internal sensor 15 illustrated in FIGS. 1 and 2, one or more triaxial acceleration sensors and one or more triaxial gyro sensors are arranged inside each of the head portion 11 and the body portion 12. Furthermore, in the internal sensor 15, an encoder is arranged at each joint of the autonomous mobile body 10. As a result, the internal sensor 15 measures the rotation angle and the rotation speed of each joint. Furthermore, the internal sensor 15 calculates a translational movement component of the autonomous mobile body 10 and a posture component around the yaw axis based on a measurement result by an encoder or the like arranged at each joint of the autonomous mobile body 10 and the shape of the autonomous mobile body 10, and outputs the calculation result to the control unit 20. Furthermore, the internal sensor 15 calculates a posture component around the pitch axis and a posture component around the roll axis of the autonomous mobile body 10 based on the measurement results by the triaxial gyro sensor and the triaxial acceleration sensor (inertial measurement unit (IMU)), and outputs the calculation result to the control unit 20.

Under the control of the control unit 20, the self-location estimation device 16 estimates a current location of the autonomous mobile body 10 based on the image information acquired by the image sensor 14 and the environmental map information stored in the environmental map information storage unit 191 of the storage unit 19 described later. The self-location estimation device 16 outputs the estimation result to the control unit 20. The self-location estimation device 16 includes a memory and hardware such as a central processing unit (CPU), a graphics processing unit (GPU), a neural network processing unit (NPU), an application specific integrated circuit (ASIC), and a field programmable gate array (FPGA). Note that a detailed configuration of the self-location estimation device 16 will be described later.

The external sensor 17 measures external environment information regarding the external environment of the autonomous mobile body 10 under the control of the control unit 20. Here, the external information is information regarding an environment around the autonomous mobile body 10. For example, the external information includes at least one or more of a distance from the autonomous mobile body 10 to each other object, a sound around the autonomous mobile body 10, geomagnetism around the autonomous mobile body 10, and a radio wave condition for wireless communication around the autonomous mobile body 10. The external sensor 17 includes a depth sensor (for example, a time of flight (ToF) sensor, a stereo camera, or the like), an infrared sensor, a human sensor, a distance sensor, a microphone, or the like. Furthermore, the external sensor 17 may be provided with a light detection and ranging (LIDAR), a magnetic sensor, and the like. Furthermore, the external sensor 17 may be provided with a receiver that receives positioning signals from positioning satellites such as a global positioning system (GPS) and a global navigation satellite system (GLONASS).

The communication unit 18 includes a communication module for communication conforming to a predetermined communication standard such as Bluetooth (registered trademark) or Wi-Fi (registered trademark). The communication unit 18 transmits predetermined information to the outside or receives information from the outside via a network under the control of the control unit 20.

The storage unit 19 includes a volatile memory, a non-volatile memory, a solid state drive (SSD), a hard disk drive (HDD), a recording medium that can be inserted from the outside, or the like. The storage unit 19 includes an environmental map information storage unit 191 and a program storage unit 192. The environmental map information storage unit 191 stores environmental map information in which a plurality of pairs (one set) of past image information acquired in the past by the image sensor 14, a feature amount of the past image information, and a self-location of the autonomous mobile body 10 at the time of acquisition of the past image information are associated with each other on a map. The program storage unit 192 stores various programs executed by the autonomous mobile body 10.

Figure 8:
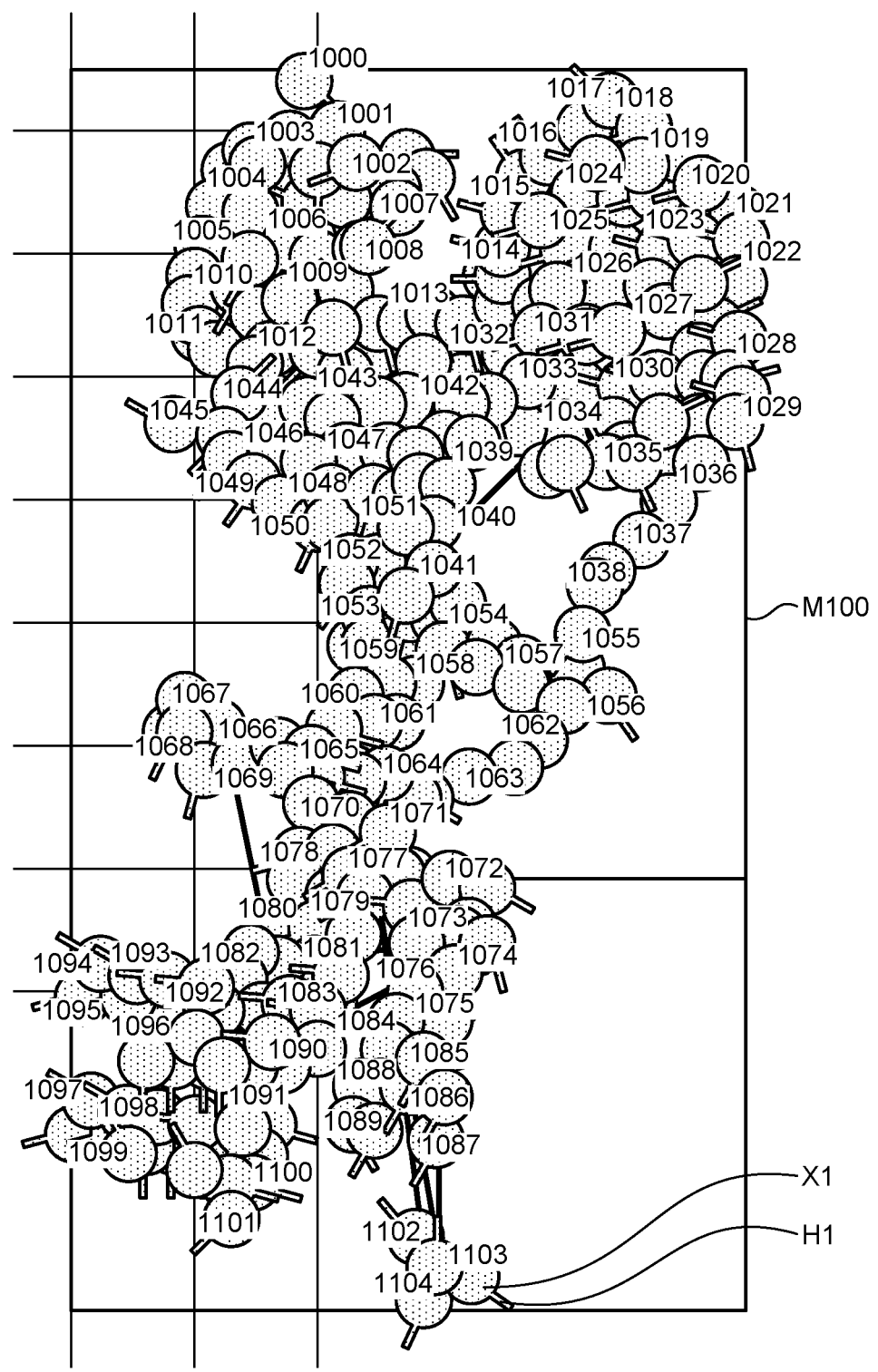
FIG. 8 is a diagram schematically illustrating an example of environmental map information stored in an environmental map information storage unit according to the first embodiment of the present disclosure.

Here, the environmental map information stored in the environmental map information storage unit 191 will be described in detail. FIG. 8 is a diagram schematically illustrating an example of the environmental map information stored in the environmental map information storage unit 191.

In environmental map information M100 illustrated in FIG. 8, a plurality of pairs (one set) of the past image information acquired in the past by the image sensor 14, one or more feature amounts of the past image information, the self-location of the autonomous mobile body 10 at the time of acquisition of the past image information, and space information such as a wall at the time of acquisition of the past image information are associated with each other on the two-dimensional or three-dimensional map. The dimension of the map may be at least one of two dimensions and three dimensions. Furthermore, the storage format of the past image information is not particularly limited, and for example, the past image information may be stored by being converted into a compression method such as joint photographic experts group (JPEG) or a predetermined format. The past image information may include various pieces of meta-information as properties in addition to the image data. Here, the meta information is data capacity, image quality, acquisition date and time (photographing date and time), acquisition time (photographing time), ID information for identifying the autonomous mobile body 10, photographing information (ISO, shutter speed, F-number), noise information, and the like. Note that the spatial information is not essential and can be changed as appropriate. Furthermore, the feature amount may be one or more kinds.

In the environmental map information M100 illustrated in FIG. 8, a plurality of small circles X1 indicate the acquired coordinates (the self-location of the autonomous mobile body 10 at the time of acquiring the image information) of each image in the real space, and a line H1 extending from the center of the circle X1 indicates the posture of the autonomous mobile body 10. Furthermore, a number added to the circle X1 indicates acquired coordinates (past self-location) at the time of acquiring the image information. In FIG. 8, the numbers of the acquired coordinates are schematically illustrated.

Here, the feature amount extracted from the image is a local feature amount such as scale-invariant feature transform (SIFT) or speeded up robust features (SURF), which is often used for image association. In the SIFT or SURF method, a pattern around a feature point is characterized, and the correspondence of the image is obtained by similarity between the feature points. Therefore, the method such as SIFT or SURF is resistant to shielding. In addition, methods such as SIFT and SURF are widely used because they can take correspondence between images captured at different locations in a space since they correspond to a change in scale and rotation.

However, in the method such as SIFT or SURF, in a case where a location or type of a light source changes or an appearance of an object on the image changes, when the image is captured at a different location in the space, it is difficult to take correspondence between images captured at different locations in the space.

Meanwhile, the multi-object detection method is hardly affected by the appearance of the object on the image. Therefore, the multi-object detection method can be classified into the same type even if the shape is slightly changed. For example, even in a case where a television in an OFF state and a television in an ON state are completely different from each other in view, the multi-object detection method can detect the television as the television. In the multi-object detection method, a type of an object present in an image is detected, and coordinates (location), a posture, a size, a relative locational relationship between a plurality of objects, and the like of the detected object are characterized. As a result, the multi-object detection method can be used for image association even in a case where the environment is greatly changed. Note that the feature amount by the multi-object detection method is weak against shielding because one feature amount is obtained from the image. However, using one or more feature amounts included in the map, the multi-object detection method can associate images even in a case where the environment is greatly changed.

Returning to FIG. 6, the configuration of the autonomous mobile body 10 will be described.

The control unit 20 integrally controls each unit constituting the autonomous mobile body 10. The control unit 20 includes a memory and hardware such as a CPU, a GPU, an NPU, an ASIC, and an FPGA. The control unit 20 drives the movement mechanism 13 to move the autonomous mobile body 10 to a predetermined location based on the estimation result of the self-location estimation device 16.

2-2. Functional Configuration of Self-Location Estimation Device

Figure 9:
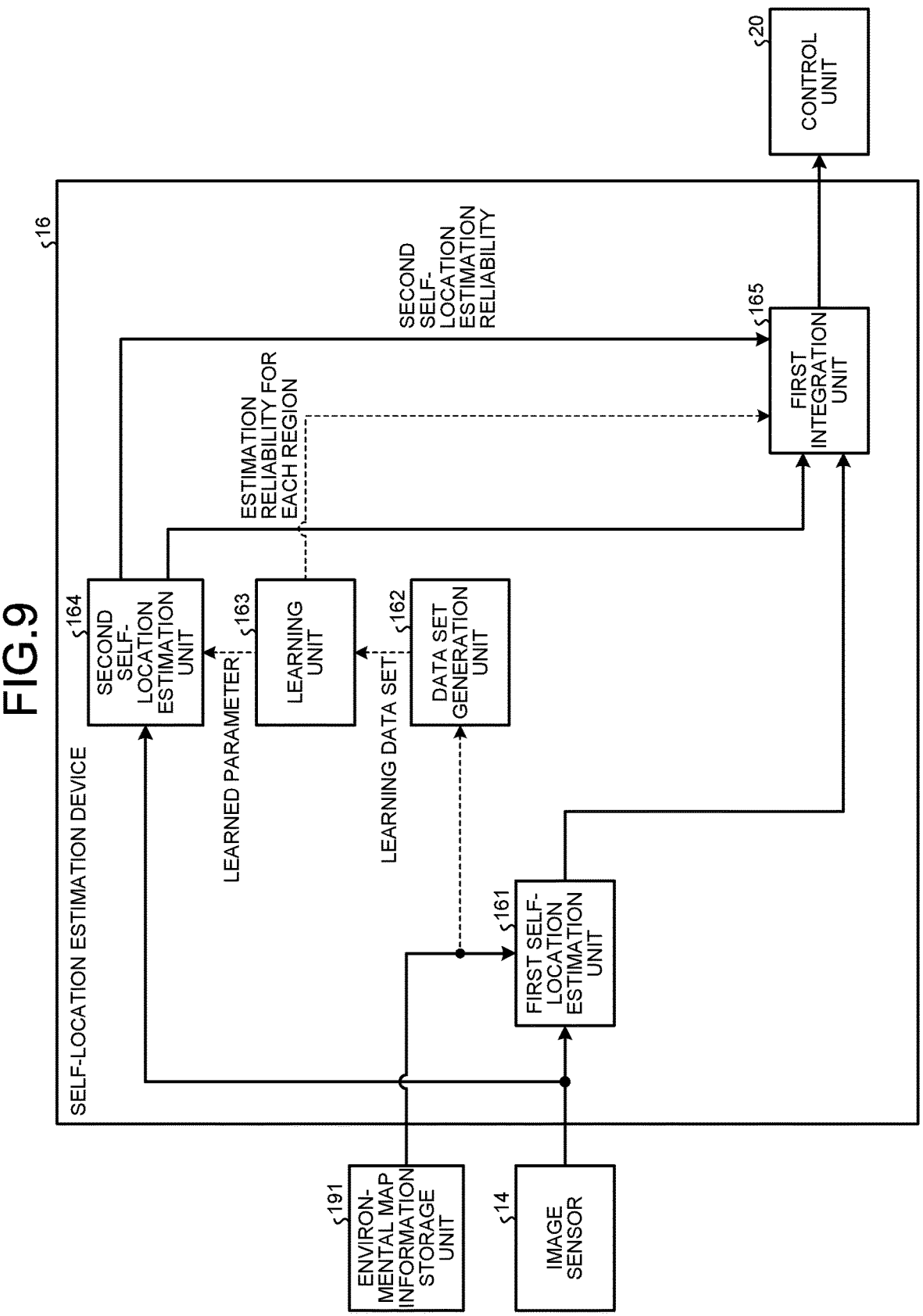
FIG. 9 is a block diagram illustrating a functional configuration of a self-location estimation device according to the first embodiment of the present disclosure.

Next, a functional configuration of the self-location estimation device 16 will be described. FIG. 9 is a block diagram illustrating a functional configuration of the self-location estimation device.

The self-location estimation device 16 illustrated in FIG. 9 includes a first self-location estimation unit 161, a data set generation unit 162, a learning unit 163, a second self-location estimation unit 164, and a first integration unit 165.

With the current image information acquired by the image sensor 14 and the environmental map information acquired from the environmental map information storage unit 191 as inputs, the first self-location estimation unit 161 estimates a first self-location (first estimation result) that is a current location of the autonomous mobile body 10 at the time of acquisition of the current image information acquired by the image sensor 14. Then, the first self-location estimation unit 161 outputs information used for evaluation of the self-location estimation reliability at the first self-location to the first integration unit 165.

2-2-1. Detailed Configuration of First Self-Location Estimation Unit

Figure 10:
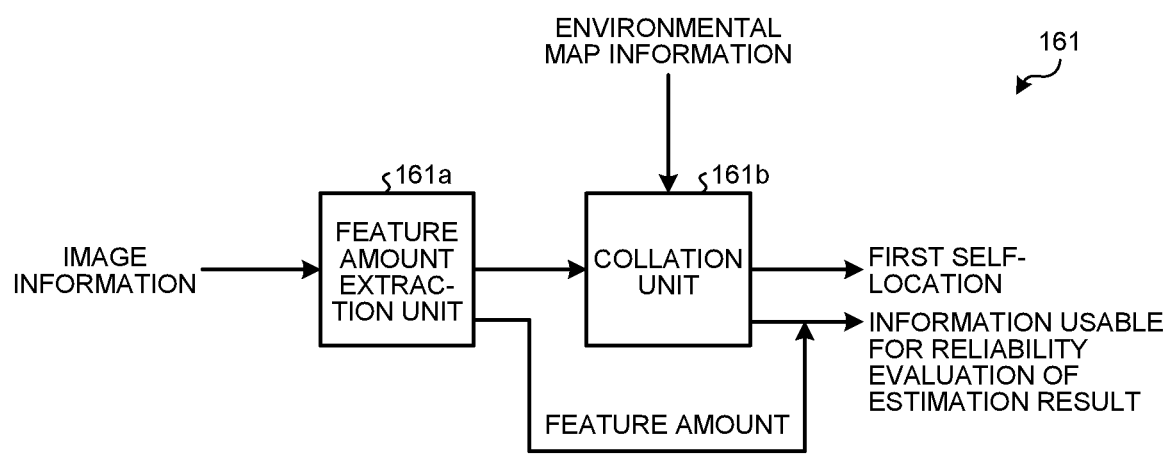
FIG. 10 is a block diagram illustrating a functional configuration of a first self-location estimation unit according to the first embodiment of the present disclosure.

Here, a detailed configuration of the first self-location estimation unit 161 will be described. FIG. 10 is a block diagram illustrating a functional configuration of the first self-location estimation unit 161.

As illustrated in FIG. 10, the first self-location estimation unit 161 includes a feature amount extraction unit 161a and a collation unit 161b.

The feature amount extraction unit 161a extracts a feature amount of the image information input from the image sensor 14, and outputs the extracted feature amount to the collation unit 161b. The feature amount extraction unit 161a extracts a feature amount of image information input from the image sensor 14 using at least one or more of the above-described SIFT, SURF, and multi-object detection method. Note that the feature amount extraction unit 161a may extract the feature amount by a known method in addition to the SIFT, the SURF, and the multi-object detection method.

The collation unit 161b collates the feature amount extracted by the feature amount extraction unit 161a with the environmental map information input from the environmental map information storage unit 191. Specifically, first, the collation unit 161b obtains similarity between one or more feature amounts included in the environmental map information input from the environmental map information storage unit 191 and the feature amount extracted by the feature amount extraction unit 161a. Then, the collation unit 161b estimates the first self-location corresponding to the current image information acquired by the image sensor 14 based on the past self-locations of the pair of feature amounts of which the similarity is equal to or more than a predetermined threshold. Thereafter, the collation unit 161b outputs the first self-location to the first integration unit 165. Here, the first self-location includes an estimated location (coordinates) of the autonomous mobile body 10 and a posture of the autonomous mobile body 10. Furthermore, the predetermined threshold can be appropriately set.

The first self-location estimation unit 161 configured in this manner outputs the first self-location and information that can be used for evaluating reliability of the estimation result at the first self-location to the first integration unit 165.

Here, the information that can be used for the reliability evaluation of the first self-location includes an error amount obtained at the time of collation between the feature amount extracted from the image information input from the image sensor 14 and the feature amount of the environmental map information, and noise, brightness, a pattern amount, texture, the number of landmarks, and the like of the image information. The first self-location estimation unit 161 outputs the error amount and at least one or more of the noise, the brightness, the pattern amount, the texture, and the number of landmarks of the image information to the first integration unit 165 as the information that can be used for the reliability evaluation of the first self-location.

Returning to FIG. 9, the description of the configuration of the self-location estimation device 16 will be continued.

The data set generation unit 162 generates a learning data set based on the environmental map information. First, the data set generation unit 162 classifies a plurality of pairs included in the environmental map information input from the environmental map information storage unit 191 into one or a plurality of groups. Specifically, the data set generation unit 162 groups each of the plurality of pieces of past image information (image information) for each region in the real space based on the self-location (coordinates) at the time of acquisition. Then, the data set generation unit 162 sets a reference self-location as a reference for each group. Thereafter, the data set generation unit 162 obtains an offset amount between the reference self-location and the past self-location for each pair for each group. Specifically, the data set generation unit 162 calculates, for each piece of past image information (image information), offset information (x.y.yaw) indicating the offset amount from the reference self-location for each group. Subsequently, the data set generation unit 162 sets an input portion of the learning data set as the past image information of each pair. Then, the data set generation unit 162 generates a learning data set in which the output portion of the learning data set is a list of each group including each pair, group information regarding each group, and offset information. Subsequently, the data set generation unit 162 outputs the learning data set to the learning unit 163.

Figure 11:
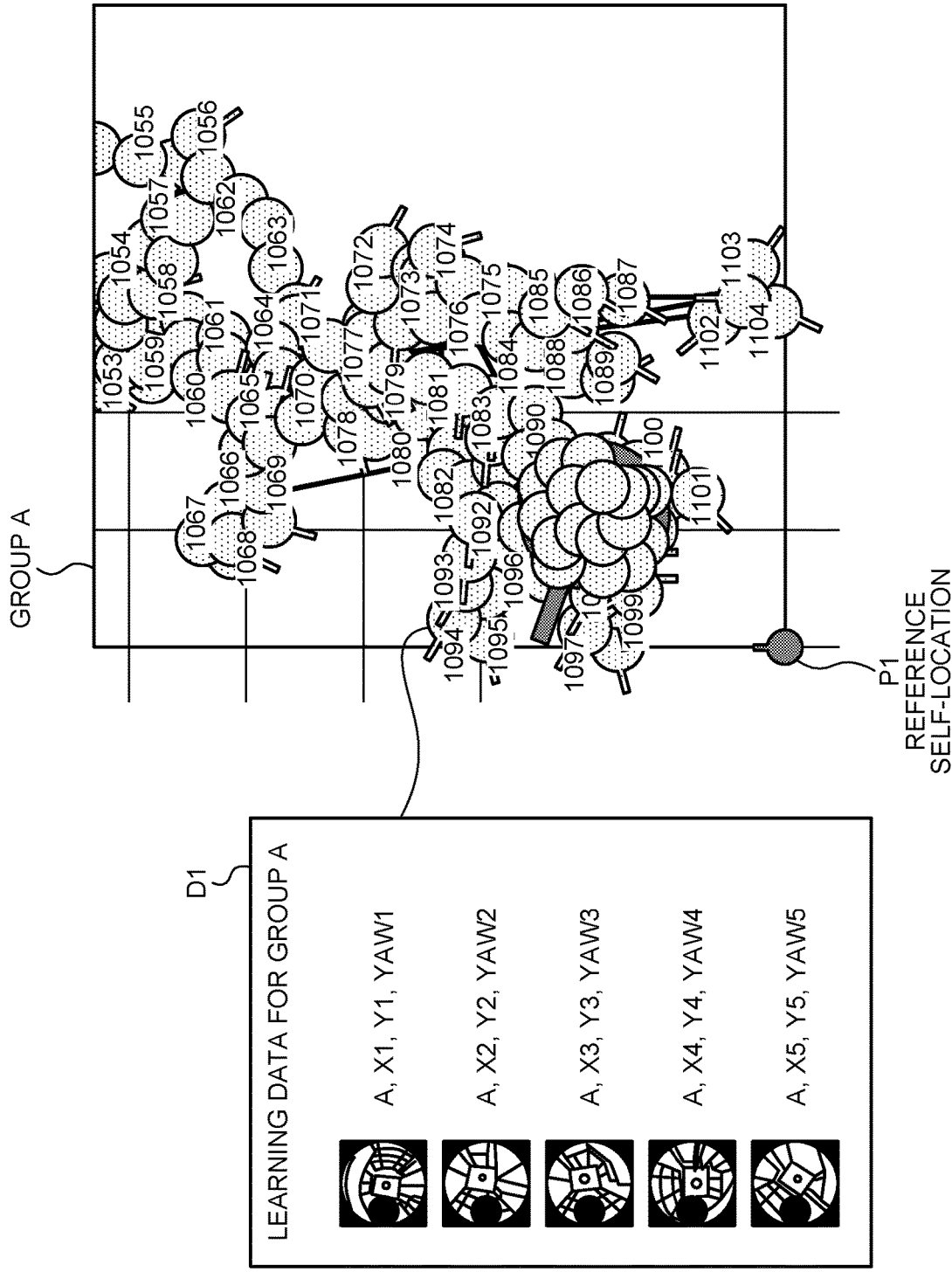
FIG. 11 is a diagram schematically illustrating an example of one group in a learning data set generated by a data set generation unit according to the first embodiment of the present disclosure.
Figure 12:
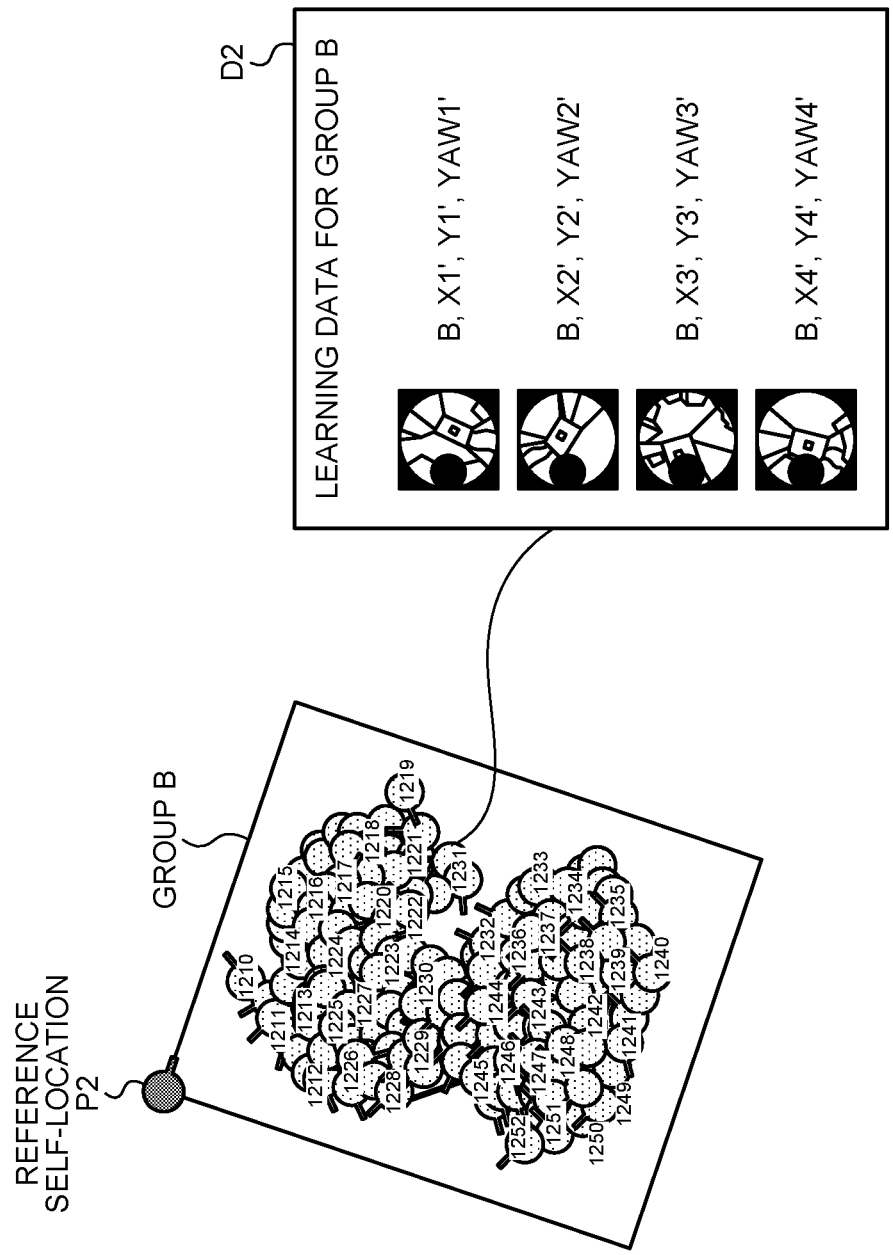
FIG. 12 is a diagram schematically illustrating an example of another group in the learning data set generated by the data set generation unit according to the first embodiment of the present disclosure.

FIG. 11 is a diagram schematically illustrating an example of one group in the learning data set generated by the data set generation unit 162. FIG. 12 is a diagram schematically illustrating an example of another group in the learning data set generated by the data set generation unit 162. In FIGS. 11 and 12, a small circle X1 indicates coordinates (self-location) in the real space at the time of acquisition of each piece of image information. A line H1 extending from the circle X1 indicates the direction (posture) of the autonomous mobile body 10. Further, a frame indicates each group (for example, group A and group B). Furthermore, circles P1 and P2 indicate the reference self-location of each group.

As illustrated in FIGS. 11 and 12, first, the data set generation unit 162 generates, for each group, a list of the past image information (image information), the group (output), the self-location (output) indicating the offset amount, and the posture (output) as learning data sets D1 and D2. The data set generation unit 162 generates the learning data sets D1 and D2 by listing all circles X1 in the environmental map information for each group. Note that the data set generation unit 162 may extract an image inappropriate for estimation of the self-location from the noise amount, the pattern amount, the brightness, and the like based on the property (meta information) included in the past image information, and exclude the inappropriate image from the learning data set. For example, the data set generation unit 162 determines whether or not the noise amount is equal to or more than a predetermined threshold for each piece of past image information, and excludes the past image information in which the noise amount is equal to or more than the predetermined threshold from the learning data set. As a result, the accuracy of the learning result of the learning unit 163 described later can be improved.

When only one piece of the environmental map information stored in the environmental map information storage unit 191 is stored, the data set generation unit 162 may omit the processing of classifying the groups. Further, when the environmental map information stored in the environmental map information storage unit 191 is three-dimensional, the data set generation unit 162 calculates the offset information regarding offset amounts of three axes (x.y.z) from the reference self-location. In addition, each of the offset information and the reference self-location may be in any format as long as it is an expression method suitable for representing the self-location such as a quaternion. Furthermore, in FIGS. 11 and 12, the data set generation unit 162 provides the group and the reference self-location for each environmental map information, but one environmental map information may be separated into a plurality of groups.

Returning to FIG. 9, the description of the configuration of the self-location estimation device 16 will be continued.

The learning unit 163 uses the learning data set generated by the data set generation unit 162 as an input, and calculates learned parameters and estimation reliability for each region on the map in the environmental map information. Specifically, the learning unit 163 obtains parameters for machine learning for obtaining the group and the self-location from the past image information (image information) described in the learning data set generated by the data set generation unit 162. In the first embodiment, a deep neural network (DNN) is assumed as the machine learning. The learning unit 163 calculates the parameters as learned parameters of a preset network so as to minimize a sum of weighted addition results of grouping errors, self-location (coordinate) errors, and posture errors for the entire data set. The learning unit 163 outputs the calculated parameter to the second self-location estimation unit 164 as a learned parameter. In this case, the learning unit 163 may calculate the estimation reliability of at least one of each group and each predetermined region in the real space based on the estimation error for each group, and output the estimation reliability for each region to the first integration unit 165.

Note that, in a case where there is no plurality of groups in the learning data set generated by the data set generation unit 162, the learning unit 163 calculates a parameter that minimizes an estimation error of the posture included in the learning data set, and outputs the calculation result as the learned parameter. Furthermore, the learning unit 163 does not need to calculate the estimation reliability for each group, and may divide the group for each predetermined region, calculate the estimation reliability for each divided region, and output the estimation reliability for each region. In this case, the learning unit 163 may calculate the estimation reliability limited to the image included in the predetermined region. Furthermore, the type of the network of the DNN may be any type as long as the learned parameter can be used in the second self-location estimation unit 164, and it is not particularly necessary to limit the type.

The second self-location estimation unit 164 estimates the second self-location, which is the current location of the autonomous mobile body 10, using a DNN in which the current image information input from the image sensor 14 and the learned parameter input from the learning unit 163 are set. Then, the second self-location estimation unit 164 outputs the second self-location (estimation result) to the first integration unit 165.

Figure 13:
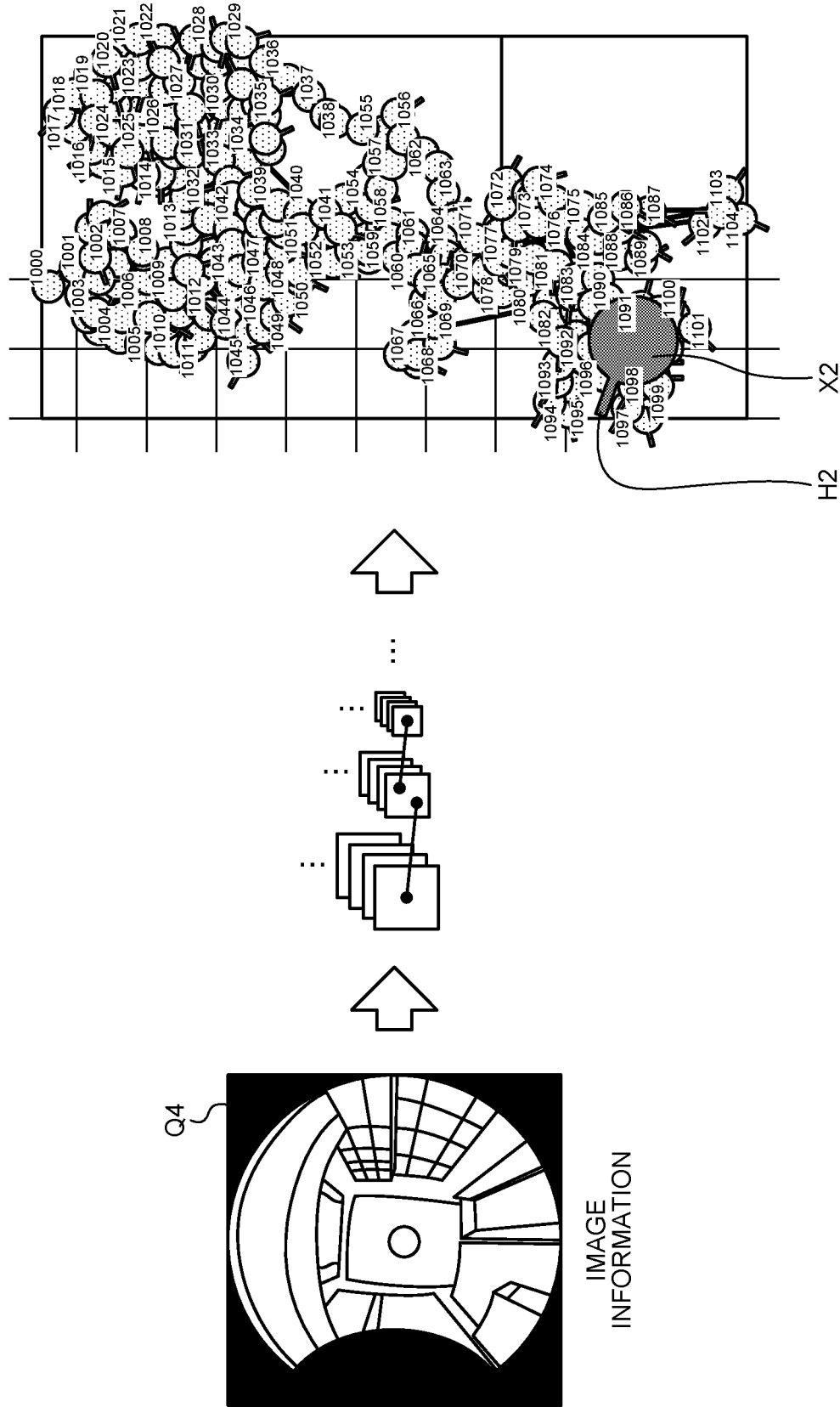
FIG. 13 is a diagram schematically illustrating a method of estimating a second self-location of the autonomous mobile body by a second self-location estimation unit according to the first embodiment of the present disclosure.

FIG. 13 is a diagram schematically illustrating a method of estimating the second self-location of the autonomous mobile body 10 by the second self-location estimation unit 164. In FIG. 13, a large circle X2 indicates the second self-location, and a straight line H2 extending from the large circle X2 indicates the posture of the autonomous mobile body 10.

As illustrated in FIG. 13, the second self-location estimation unit 164 estimates the second self-location, which is the current location of the autonomous mobile body 10, using the current image information Q4 input from the image sensor 14 and the DNN in which the learned parameter input from the learning unit 163 is set. In this case, the second self-location estimation unit 164 outputs the second self-location estimation reliability representing the reliability of the second self-location (estimation result) to the first integration unit 165. Note that the type of the network of the DNN is not particularly limited as long as the learned parameter can be used in the second self-location estimation unit 164.

Returning to FIG. 9, the description of the configuration of the self-location estimation device 16 will be continued.

The first integration unit 165 estimates the current self-location of the autonomous mobile body 10 based on the first self-location input from the first self-location estimation unit 161 and the second self-location input from the second self-location estimation unit 164, and outputs the estimation result to the control unit 20.

Note that the first integration unit 165 calculates a weight coefficient to be multiplied by each of the first self-location and the second self-location based on at least one of the estimation reliability for each region input from the learning unit 163 and the second self-location estimation reliability input from the second self-location estimation unit 164. Then, the first integration unit 165 may switch a blend ratio between the first self-location and the second self-location by multiplying each of the first self-location and the second self-location by the weight coefficient. Furthermore, in a case where there is no second self-location estimation reliability, the first integration unit 165 may modulate the estimation reliability for each region, or may have a value that increases together with the estimation reliability. In addition, in a case where there is no estimation reliability for each region, the first integration unit 165 may modulate the second self-location estimation reliability as long as it is a value that increases together with the self-location estimation reliability.

2-3. Processing of Autonomous Mobile Body

Figure 14:
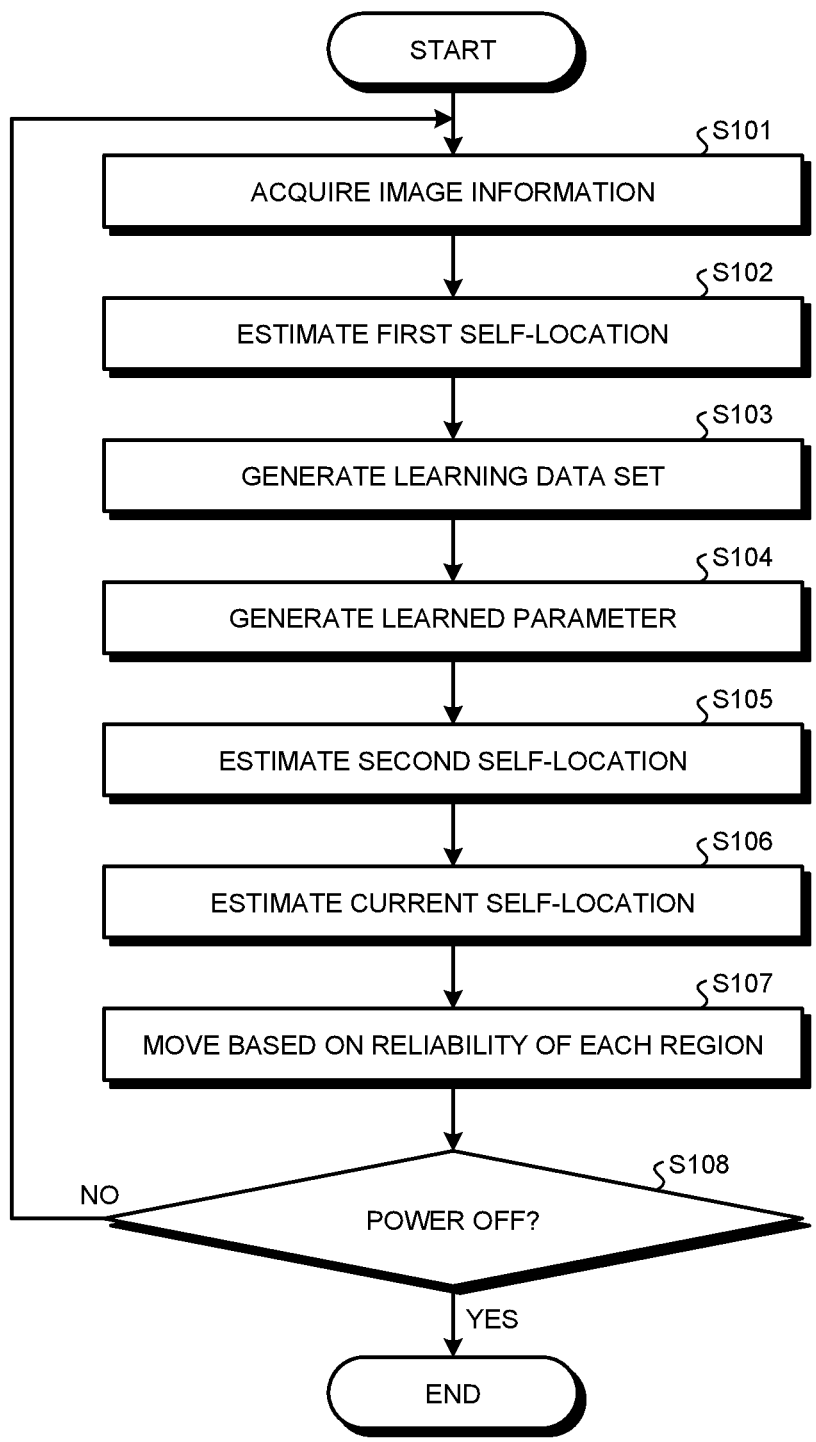
FIG. 14 is a flowchart illustrating an outline of processing executed by the autonomous mobile body according to the first embodiment of the present disclosure.

Next, processing executed by the autonomous mobile body 10 will be described. FIG. 14 is a flowchart illustrating an outline of processing executed by the autonomous mobile body 10.

As illustrated in FIG. 14, first, the image sensor 14 acquires image information by imaging a predetermined field of view (Step S101).

Subsequently, based on the current image information acquired by the image sensor 14 and the environmental map information acquired from the environmental map information storage unit 191, the first self-location estimation unit 161 estimates the first self-location of the autonomous mobile body 10 at the time of acquisition when the current image information acquired by the image sensor 14 is acquired (Step S102).

Thereafter, the data set generation unit 162 generates the learning data set based on the self-location (coordinates) at the time of acquisition of each of the plurality of pieces of image information (past image information) included in the environmental map information input from the environmental map information storage unit 191 (Step S103).

Subsequently, the learning unit 163 generates a learned parameter for machine learning for obtaining the group and the self-location from the image information described in the learning data set generated by the data set generation unit 162 (Step S104). In this case, the learning unit 163 calculates the estimation reliability of at least one of each group and each predetermined region in the real space based on the estimation error for each group, and outputs the estimation reliability to the first integration unit 165.

Thereafter, the second self-location estimation unit 164 estimates the second self-location based on the current image information input from the image sensor 14 and the learned parameter generated by the learning unit 163.

Subsequently, the first integration unit 165 estimates the current self-location of the autonomous mobile body 10 based on the first self-location input from the first self-location estimation unit 161 and the second self-location input from the second self-location estimation unit 164 (Step S106).

Thereafter, the control unit 20 drives the movement mechanism 13 based on the estimation result of the first integration unit 165 and the estimation reliability of each region input from the learning unit 163, thereby moving the autonomous mobile body 10 to a region having low estimation reliability (Step S107).

Subsequently, in a case where the power supply to the autonomous mobile body 10 is turned off (Step S108; Yes), the autonomous mobile body 10 ends the present processing. Meanwhile, when the power of the autonomous mobile body 10 is not turned off (Step S108: No), the autonomous mobile body 10 returns to Step S101 described above.

2-4. Action and Effect

According to the first embodiment described above, the first self-location estimation unit 161 estimates the first self-location based on the environmental map information created by the SLAM processing and the current image information. Then, the second self-location estimation unit 164 estimates the second self-location based on the learned parameter in which the environmental map information created by the SLAM processing is learned by machine learning and the current image information. Thereafter, the first integration unit 165 integrates the first self-location and the second self-location to estimate the current self-location of the autonomous mobile body 10. As a result, even when the autonomous mobile body 10 frequently pauses or the external environment greatly changes, it is possible to estimate the stable self-location of the autonomous mobile body 10 with high accuracy.

Furthermore, according to the first embodiment, the self-location estimation device 16 includes the data set generation unit 162 and the learning unit 163. Then, the data set generation unit 162 generates the learning data set based on the environmental map information using the image information acquired by the actual autonomous mobile body 10. Furthermore, the learning unit 163 uses the learning data set as an input, and calculates the learned parameter and the estimation reliability of each of the plurality of regions on the map. As a result, a stable and highly accurate self-location optimized for the environment in which the autonomous mobile body 10 is used can be estimated.

Furthermore, according to the first embodiment, the first integration unit 165 estimates the current self-location of the autonomous mobile body 10 by integrating the first self-location and the second self-location based on at least one of the estimation reliability of each of the plurality of regions and the second self-location estimation reliability. As a result, even in a region where learning is insufficient, sufficient accuracy of the self-location estimation can be obtained.

Furthermore, according to the first embodiment, the data set generation unit 162 classifies the plurality of pairs into one or the plurality of groups, and sets the reference self-location to be a reference for each group. Then, the data set generation unit 162 obtains, for each group, an offset amount between the reference self-location and the past self-location for each pair. Thereafter, the data set generation unit 162 generates the learning data set in which the input portion of the learning data set is the past image information of the pair and the output portion of the learning data set is the group information related to the group including the pair and the offset amount. As a result, the data set generation unit 162 generates learning data suitable for machine learning from an image group having a severe environmental change. As a result, a stable and highly accurate self-location optimized for the environment in which the autonomous mobile body 10 is used can be estimated.

In addition, according to the first embodiment, the data set generation unit 162 determines whether or not the property of the past image information among the plurality of pairs in the environmental map information is within the allowable range. Then, since the data set generation unit 162 excludes the feature amount associated with the pair of past image information that is not within the allowable range and the past self-location from the learning data set, it is possible to generate learning data suitable for machine learning from an image group having a severe environmental change.

Furthermore, according to the first embodiment, the control unit 20 controls the movement mechanism 13 so as to preferentially move to a region with low estimation reliability for each of the plurality of regions based on the current self-location estimated by the first integration unit 165. As a result, the more the autonomous mobile body 10 acts in the environment of the real space, the more the stability and accuracy of the self-location can be improved.

3. SECOND EMBODIMENT

Next, a second embodiment will be described. The second embodiment is different in configuration from the self-location estimation device 16 according to the first embodiment described above. Hereinafter, a self-location estimation device according to the second embodiment will be described.

3-1. Functional Configuration of Self-Location Estimation Device

Figure 15:
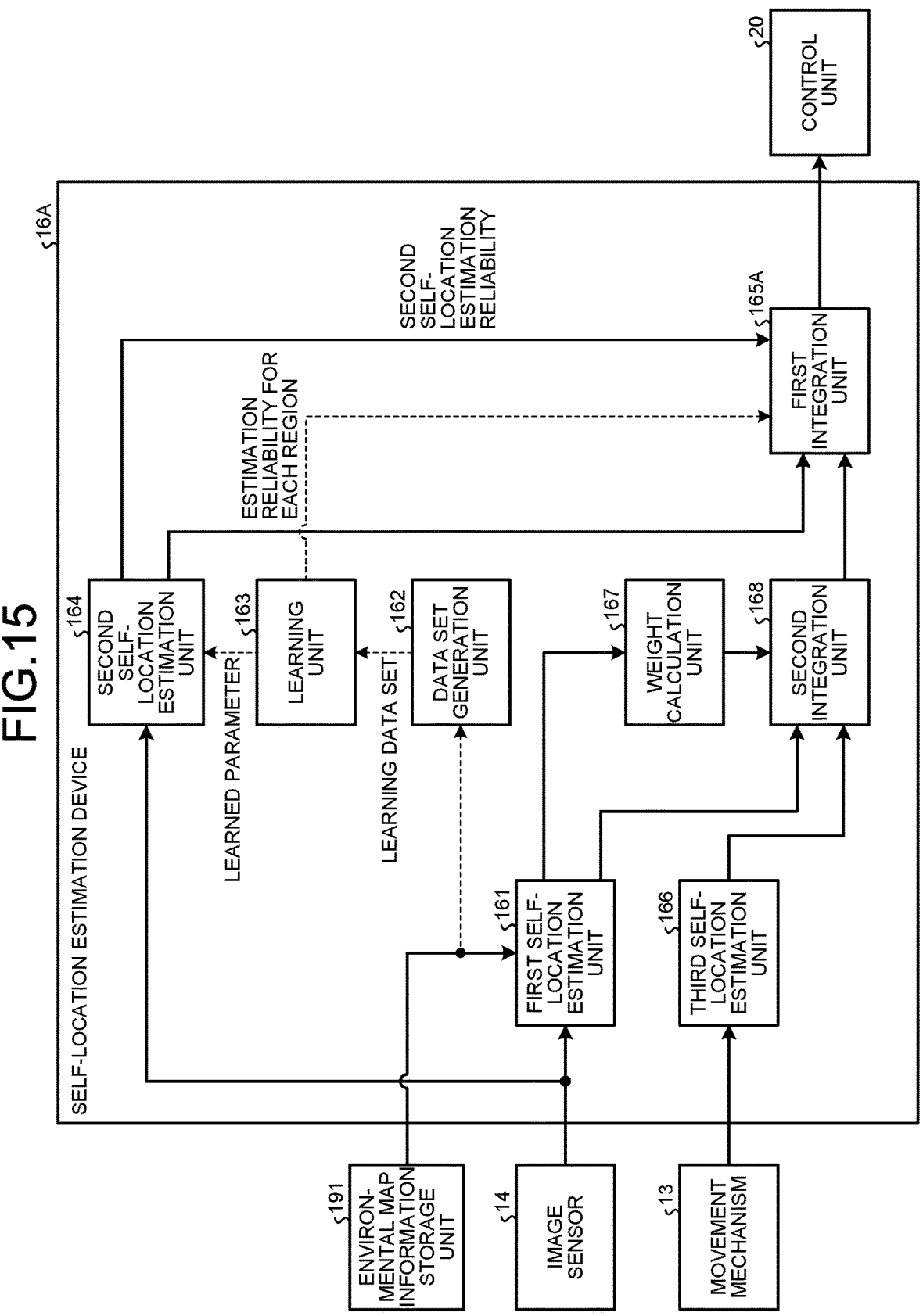
FIG. 15 is a block diagram illustrating a functional configuration of a self-location estimation device according to a second embodiment of the present disclosure.

FIG. 15 is a block diagram illustrating a functional configuration of the self-location estimation device according to the second embodiment. A self-location estimation device 16A illustrated in FIG. 15 further includes a third self-location estimation unit 166, a weight calculation unit 167, and a second integration unit 168 in addition to the configuration of the self-location estimation device 16 according to the first embodiment described above. Furthermore, the self-location estimation device 16A further includes a first integration unit 165A instead of the above-described first integration unit 165.

The third self-location estimation unit 166 estimates the self-location of the autonomous mobile body 10 based on odometry information. Specifically, the third self-location estimation unit 166 estimates the self-location of the autonomous mobile body 10 by calculating an integral value of a displacement amount for each certain period based on a movement amount according to the operation of the movement mechanism 13, such as a rotation speed of a wheel in the movement mechanism 13 and the number of steps of walking. Hereinafter, this estimation result is referred to as a third self-location. Note that the odometry includes at least one or more of visual odometry by the external sensor 17, laser odometry using a laser sensor, and TOF odometry using a TOF sensor. The third self-location estimation unit 166 may estimate the third self-location by combining a plurality of visual odometry, laser odometry, and TOF odometry. As a result, the accuracy of the third self-location can be further improved.

The weight calculation unit 167 calculates a weight coefficient to be multiplied by the first self-location based on the first self-location estimation reliability of the first self-location. Specifically, the weight calculation unit 167 converts information that can be used for reliability evaluation of the estimation result input from the first self-location estimation unit 161 into an actual brent ratio. For example, in a case where the input information is a feature amount collation error, the estimation reliability decreases as the error increases. Therefore, the weight calculation unit 167 outputs, to the second integration unit 168, a weight coefficient capable of performing modulation on the first self-location estimation reliability input from the first self-location estimation unit 161.

Figure 16:
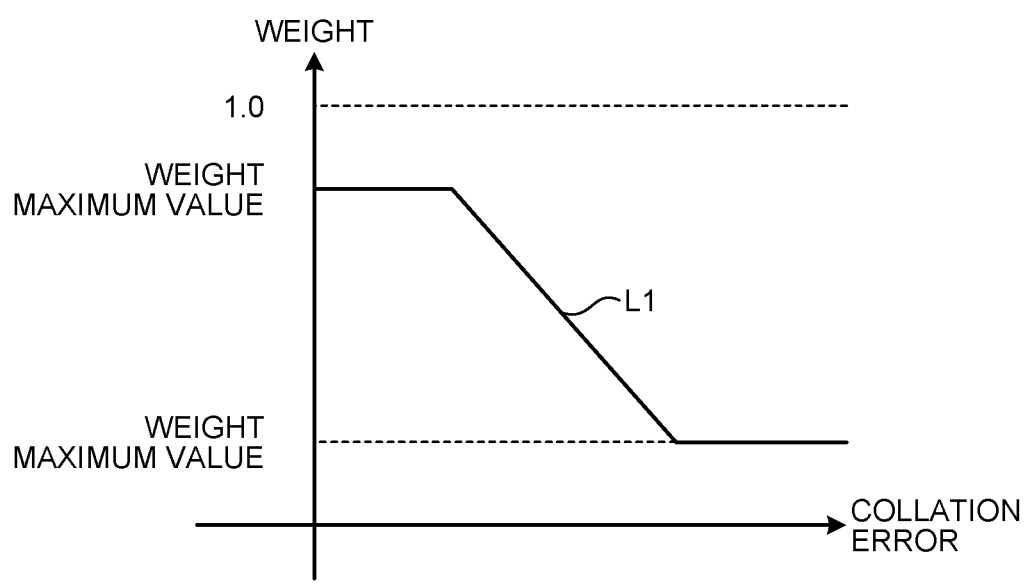
FIG. 16 is a diagram schematically illustrating weighting performed by a weight calculation unit according to a second embodiment of the present disclosure.

FIG. 16 is a diagram schematically illustrating weighting performed by the weight calculation unit 167. In FIG. 16, a horizontal axis represents the collation error and a vertical axis represents the weight. In FIG. 16, a polygonal line L1 indicates an example of modulation of the weight coefficient. In FIG. 16, it is assumed that a value of the blend ratio is converted into a weight of 0.0 to 1.0.

As indicated by a polygonal line L1 in FIG. 16, in the case of a feature amount collation error, the weight calculation unit 167 sets a weight coefficient to be modulated such that the larger the error, the lower the estimation reliability. Specifically, the weight calculation unit 167 outputs, to the second integration unit 168, a weight coefficient capable of performing modulation according to a collation error on the first self-location estimation reliability input from the first self-location estimation unit 161. Note that the weight coefficient can be appropriately changed as long as it is a value that increases together with the first self-location estimation reliability of the first self-location estimation unit 161.

The second integration unit 168 generates a second integration result obtained by integrating the first self-location input from the first self-location estimation unit 161 and the third self-location input from the third self-location estimation unit 166 based on the weight coefficient input from the weight calculation unit 167. Specifically, the second integration unit 168 generates the second integration result by the following Formula (1).

$$\text{Second integration result} = \text{weight coefficient} \times \text{first self-location} + (1 - \text{weight coefficient}) \times \text{third self-location} \quad \ldots (1)$$

The first integration unit 165 A integrates the second self-location input from the second self-location estimation unit 164 and the second integration result input from the second integration unit 168 to output a first integration result obtained by estimating the current self-location of the autonomous mobile body 10 to the control unit 20.

3-2. Processing of Self-Location Estimation Device

Figure 17:
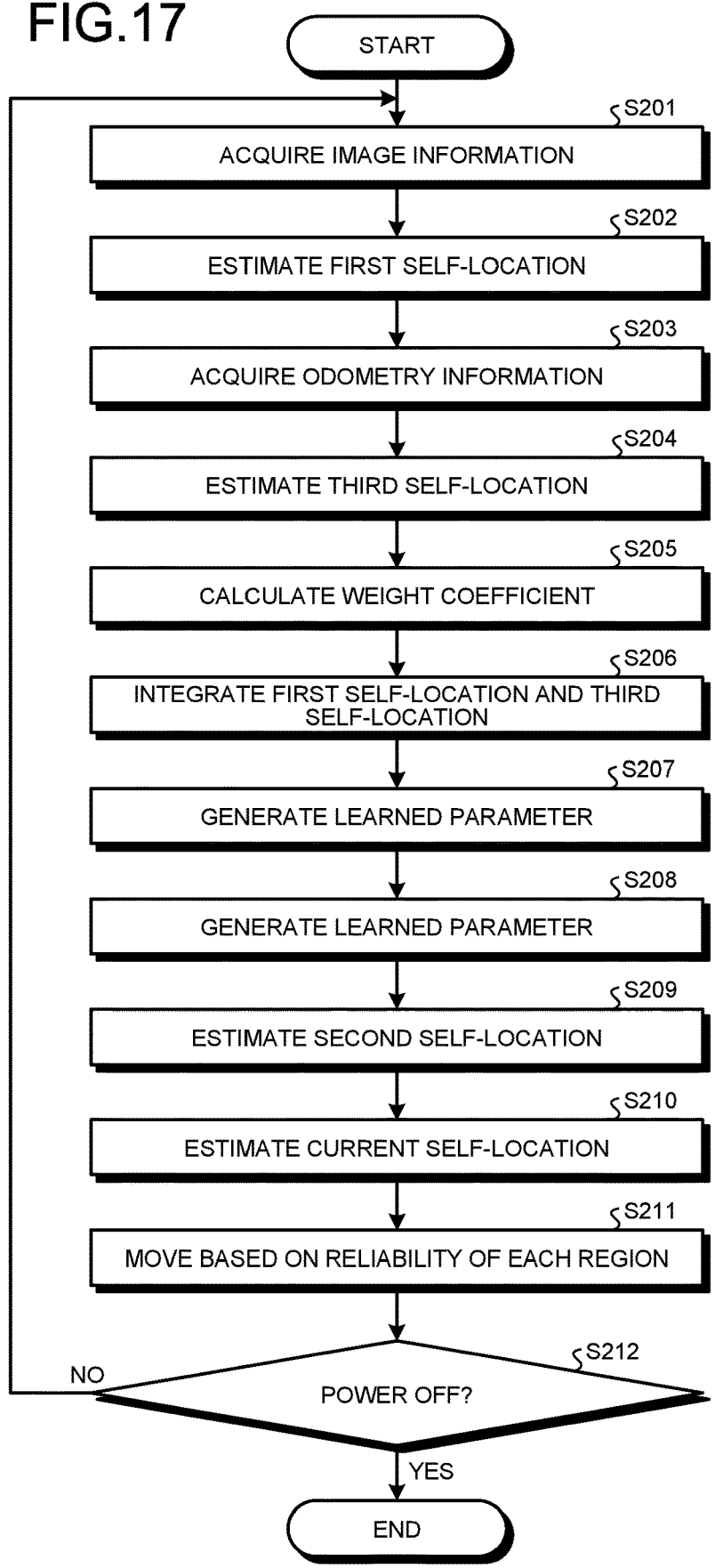
FIG. 17 is a flowchart illustrating an outline of processing executed by an autonomous mobile body according to a second embodiment of the present disclosure.

Next, processing executed by the autonomous mobile body 10 including the self-location estimation device 16A will be described. FIG. 17 is a flowchart illustrating an outline of processing executed by the autonomous mobile body 10.

Since Steps S201 and S202 in FIG. 17 are similar to Steps S101 and S102 in FIG. 14 described above, detailed description thereof is omitted.

In Step S203, the third self-location estimation unit 166 estimates the third self-location of the autonomous mobile body 10 based on the odometry information.

Subsequently, the weight calculation unit 167 calculates a weight coefficient indicating a blend ratio at the time of integrating the first self-location and the third self-location based on the information that can be used for the reliability evaluation of the first self-location input from the first self-location estimation unit 161 (Step S205).

Thereafter, the second integration unit 168 generates a second integration result obtained by integrating the first self-location input from the first self-location estimation unit 161 and the third self-location input from the third self-location estimation unit 166 based on the weight coefficient input from the weight calculation unit 167 (Step S206).

Steps S207 to S209 are similar to Steps S103 to S105 in FIG. 14 described above, and thus, detailed description thereof is omitted.

In Step S210, the first integration unit 165 A integrates the second self-location input from the second self-location estimation unit 164 and the second integration result input from the second integration unit 168, thereby outputting an estimation result obtained by estimating the current self-location of the autonomous mobile body 10 to the control unit 20.

Since Steps S211 and S212 are similar to Steps S107 and S108 in FIG. 14 described above, detailed description thereof is omitted.

3-3. Action and Effect

According to the second embodiment described above, the third self-location estimation unit 166 estimates the current third self-location based on the odometry information of the autonomous mobile body 10. Then, the weight calculation unit 167 calculates a weight coefficient to be multiplied by the first self-location based on the first self-location estimation reliability of the first self-location. Furthermore, the second integration unit 168 integrates the first self-location and the third self-location based on the weight coefficient. Finally, the first integration unit 165 A estimates the current self-location of the autonomous mobile body 10 by integrating the integration result integrated by the second integration unit 168 and the second self-location. As a result, since the blend ratio between the first self-location and the second self-location is changed based on the first self-location estimation reliability of the first self-location, the stability and accuracy of the self-location can be improved as the autonomous mobile body 10 becomes active in the environment of the real space.

3-4. Modification of Second Embodiment

Figure 18:
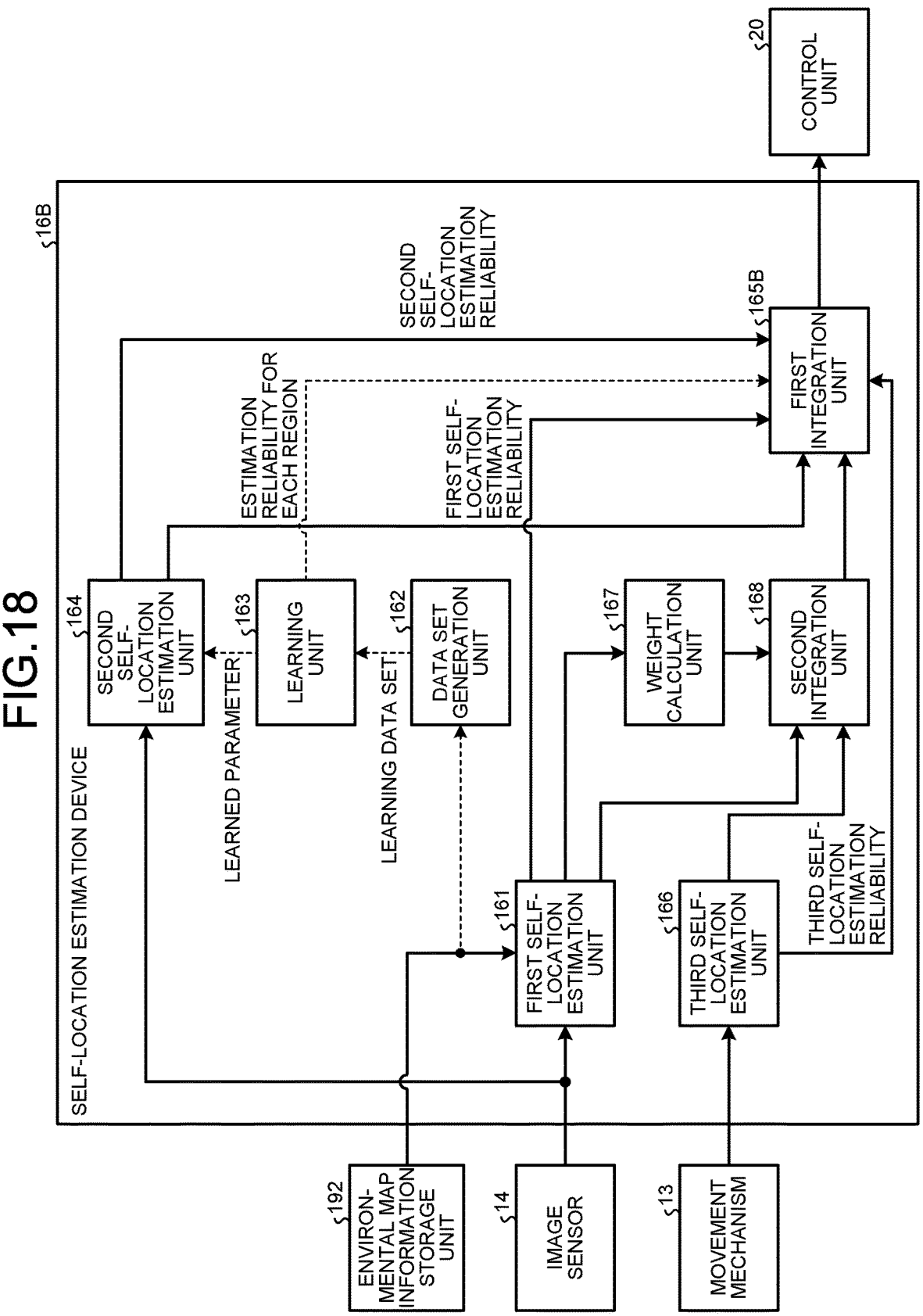
FIG. 18 is a block diagram illustrating a functional configuration of a self-location estimation device according to a modification of the second embodiment of the present disclosure.

Next, a modification of the second embodiment will be described. FIG. 18 is a block diagram illustrating a functional configuration of a self-location estimation device according to a modification of the second embodiment. A self-location estimation device 16B illustrated in FIG. 18 includes a first integration unit 165B in place of the first integration unit 165 A of the self-location estimation device 16A according to the second embodiment described above.

The first integration unit 165B estimates the current self-location of the autonomous mobile body 10 based on at least one of the first self-location estimation reliability input from the first self-location estimation unit 161 and the third self-location estimation reliability input from the third self-location estimation unit 166. Specifically, the first integration unit 165B estimates the current self-location of the autonomous mobile body 10 by integrating the second self-location and the second integration result such that the ratio of the high estimation reliability becomes high based on at least one of the first self-location estimation reliability and the third self-location estimation reliability. In this case, when each of the first self-location estimation reliability and the third self-location estimation reliability is lower than a predetermined value, the first integration unit 165B may estimate the current self-location of the autonomous mobile body 10 by integrating the second self-location and the second integration result without using the first self-location estimation reliability and the third self-location estimation reliability.

3-5. Action and Effect

According to the modification of the second embodiment described above, the first integration unit 165B integrates the first self-location, the second self-location, and the second integration result based on at least one of the first self-location estimation reliability and the third self-location estimation reliability. As a result, since the blend ratio between the second self-location and the second integration result is changed, the stability and accuracy of the self-location can be improved as the autonomous mobile body 10 becomes more active in the environment of the real space.

4. THIRD EMBODIMENT

Next, a third embodiment will be described. The third embodiment is different in configuration from the self-location estimation device 16 according to the first embodiment described above. Hereinafter, a self-location estimation device according to a third embodiment will be described.

4-1. Functional Configuration of Self-Location Estimation Device

Figure 19:
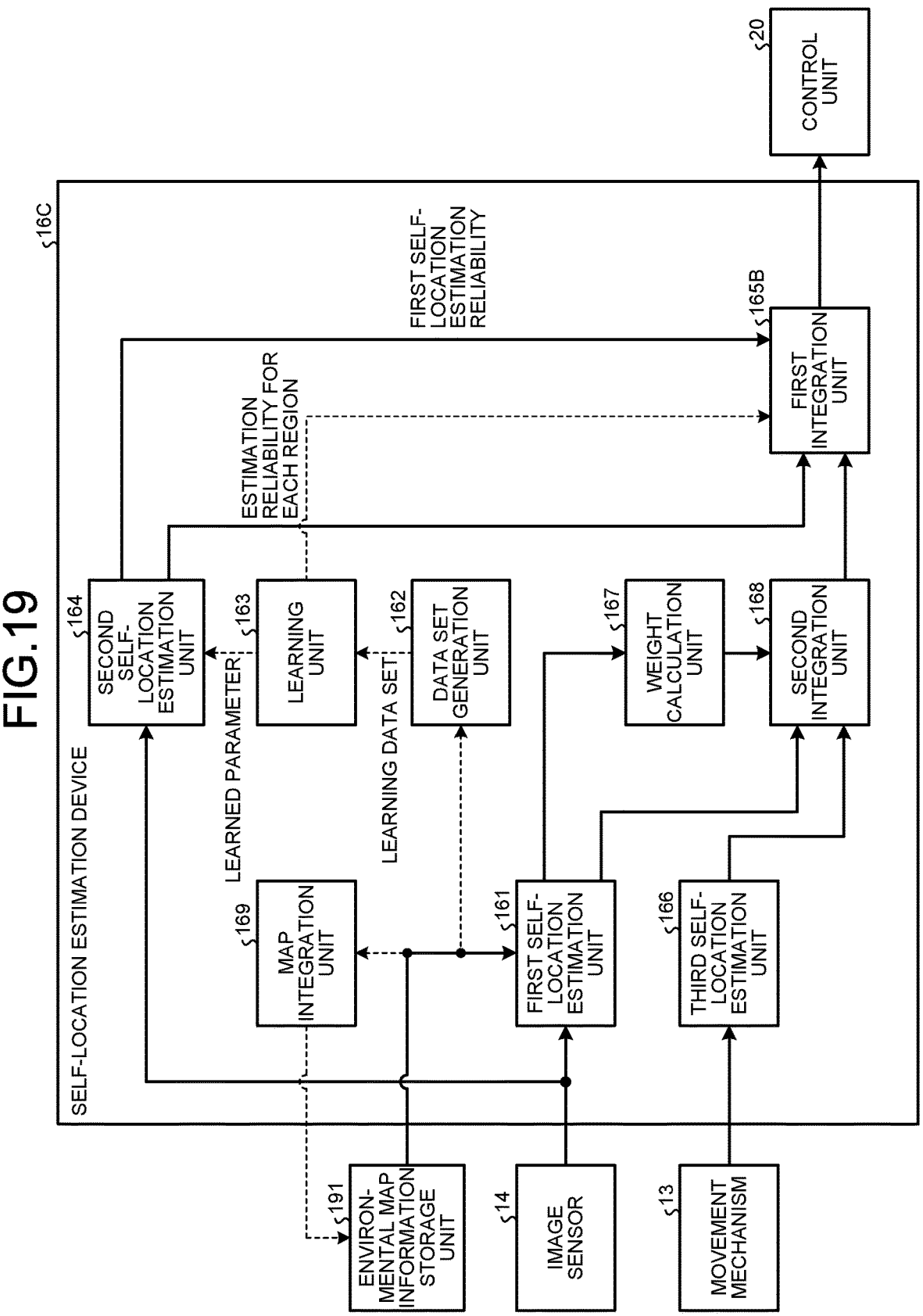
FIG. 19 is a block diagram illustrating a functional configuration of a self-location estimation device according to a third embodiment of the present disclosure.

FIG. 19 is a block diagram illustrating a functional configuration of a self-location estimation device according to a third embodiment. A self-location estimation device 16C illustrated in FIG. 19 further includes a map integration unit 169 in addition to the configuration of the self-location estimation device 16A according to the second embodiment described above.

The map integration unit 169 integrates the plurality of pieces of environmental map information stored in the environmental map information storage unit 191. Specifically, first, the map integration unit 169 determines whether or not the plurality of pieces of environmental map information is stored in the environmental map information storage unit 191. Then, when it is determined that the plurality of pieces of environmental map information is stored in the environmental map information storage unit 191, the map integration unit 169 evaluates similarity between pairs of past image information included in each pair associated with the environmental map information, a first feature amount extracted from the past image information, a second feature amount extracted from the past image information, and a past self-location at the time of acquisition of the past image information with respect to the plurality of pieces of environmental map information different from each other, using a second feature amount strong against an environmental change. Subsequently, the map integration unit 169 counts the number of pairs of which the similarity is equal to or more than a predetermined threshold, and in a case where the number of pairs is equal to or more than a predetermined value among a plurality of mutually different pieces of environmental map information, the map integration unit 169 integrates the mutually different pieces of environmental map information based on past self-locations of pairs of which the similarity is equal to or more than the predetermined threshold. Thereafter, the map integration unit 169 updates the environmental map information stored in the environmental map information storage unit 191. Here, each of the predetermined threshold and the predetermined value can be appropriately set.

Figure 20:
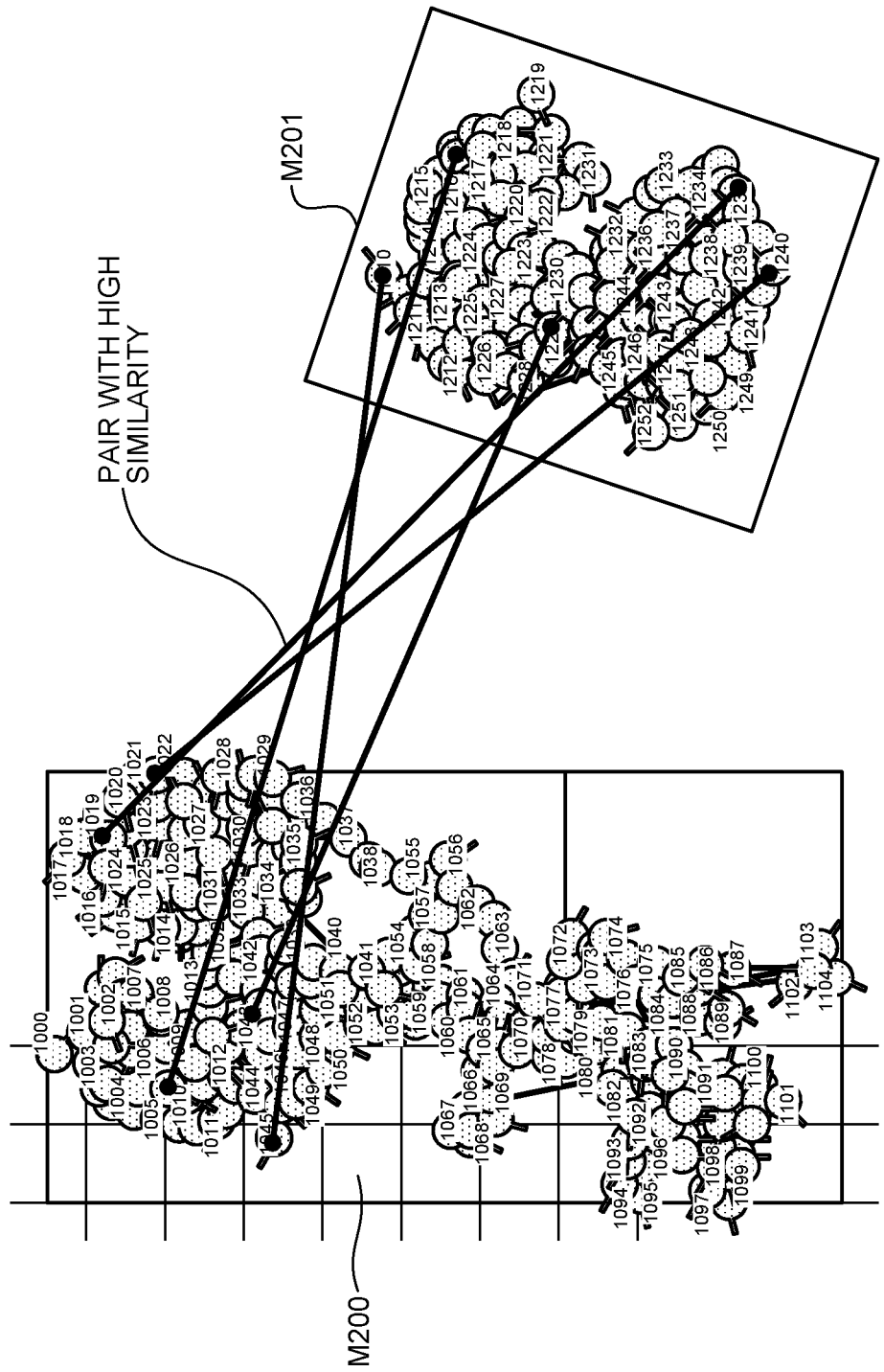
FIG. 20 is a diagram schematically illustrating a state before integration in which a map integration unit according to the third embodiment of the present disclosure integrates mutually different pieces of environmental map information.
Figure 21:
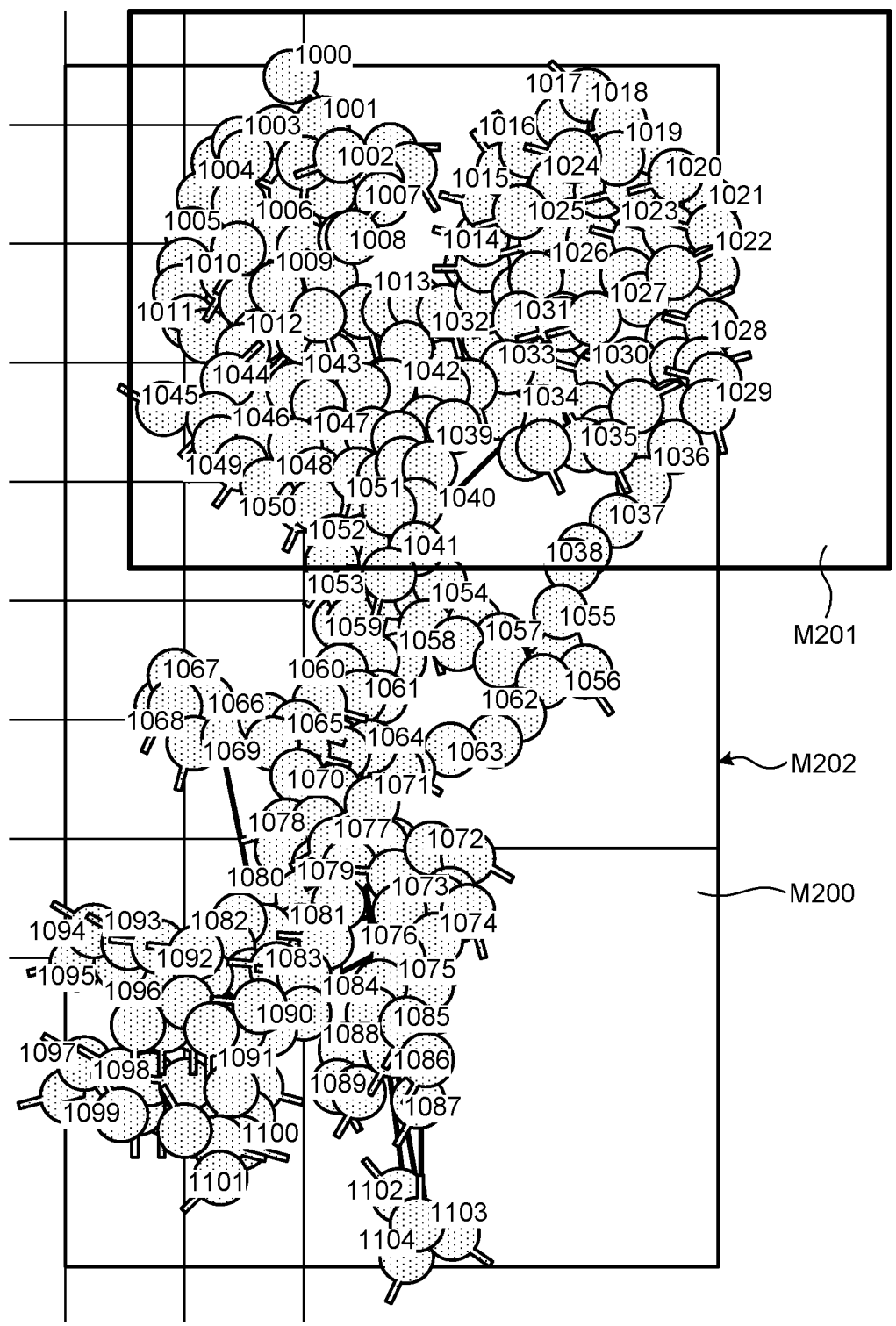
FIG. 21 is a view schematically illustrating a state after the integration in which the map integration unit according to the third embodiment of the present disclosure integrates the mutually different pieces of environmental map information.
Figure 22:
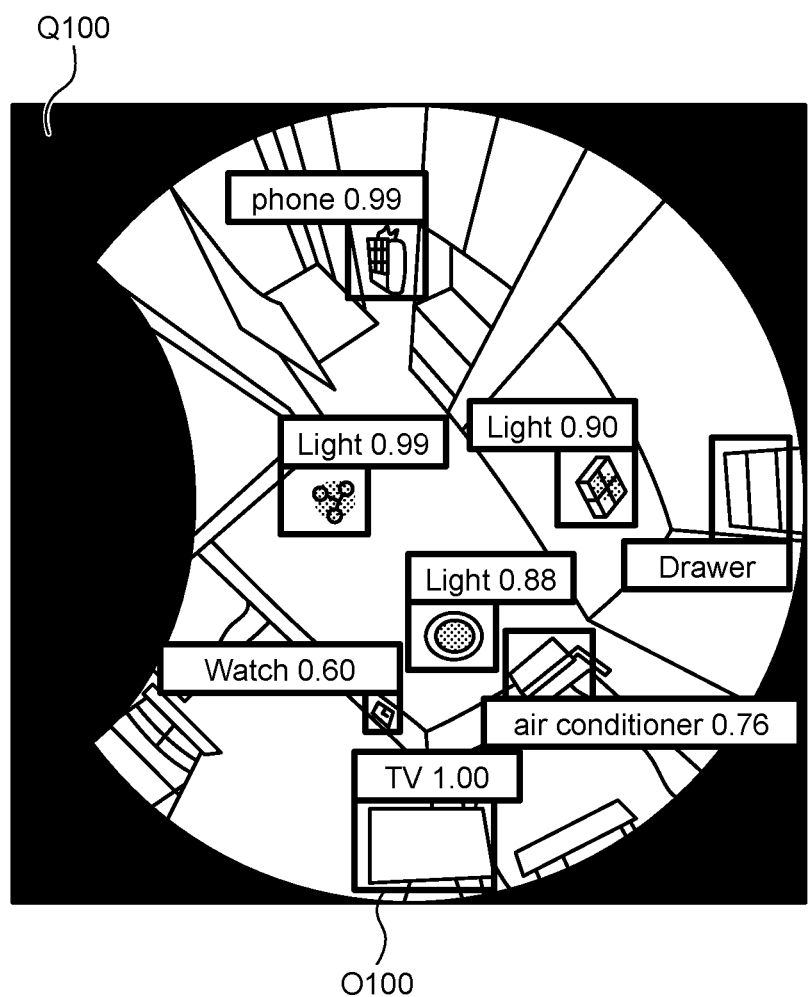
FIG. 22 is a diagram schematically illustrating a second feature amount detected when multi-object detection is performed on daytime image information according to the third embodiment of the present disclosure.
Figure 23:
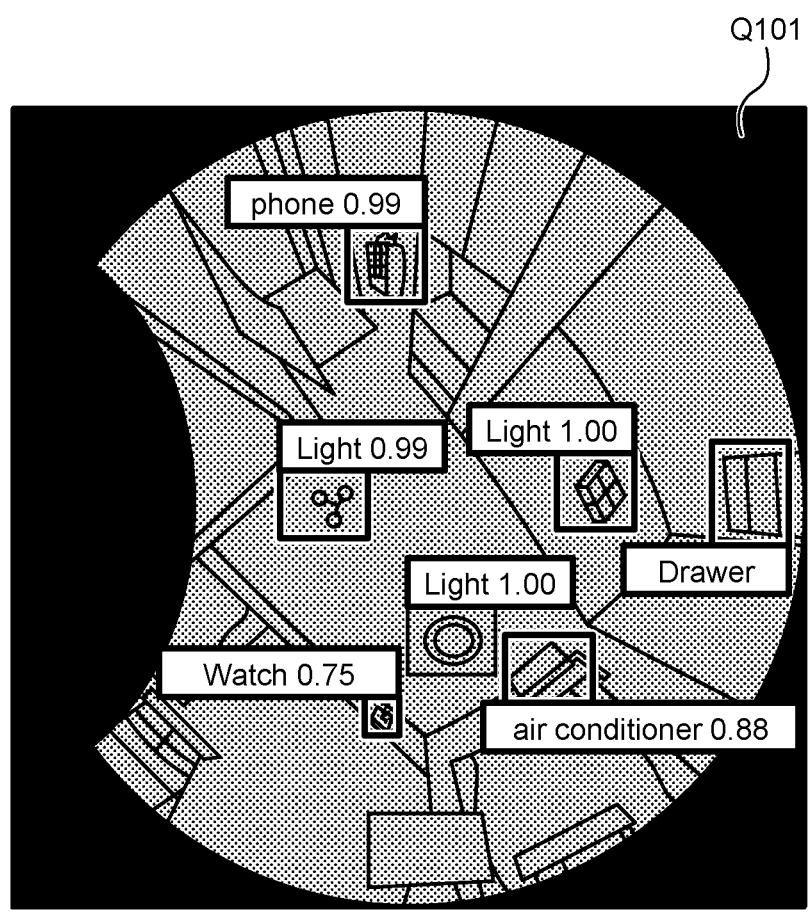
FIG. 23 is a diagram schematically illustrating a second feature amount detected when the multi-object detection is performed on night image information according to a third embodiment of the present disclosure.

FIG. 20 is a diagram schematically illustrating a state before integration in which the map integration unit 169 integrates the mutually different pieces of environmental map information. FIG. 21 is a diagram schematically illustrating a state after integration in which the map integration unit 169 integrates the mutually different pieces of environmental map information. FIG. 22 is a diagram schematically illustrating the second feature amounts detected when multi-object detection is performed on daytime image information. FIG. 23 is a diagram schematically illustrating the second feature amounts detected when multi-object detection is performed on night image information.

As illustrated in FIGS. 20 and 21, first, the map integration unit 169 evaluates similarity between a plurality of pairs belonging to each of the environmental map information M200 and M201 for each of the environmental map information M200 and M201 based on the second feature amount.

Here, the second feature amount is at least one or more of a size, a location, a type, and a direction of the object detected by the multi-object detection method. Specifically, as illustrated in an image Q200 in FIG. 22 and an image Q201 in FIG. 23, the second feature amount is an object that functions as a landmark appearing in the images Q200 and Q201. For example, as illustrated in FIG. 22, in image Q200, a television (TV) and a location of the television are included as the objects functioning as the second feature amounts. Similarly, in the images Q200 and Q201, at least one or more of the sizes, locations, types, and orientations of the plurality of objects are detected as the second feature amount.

The map integration unit 169 counts the number of pairs in which the similarity of the second feature amount is equal to or more than a predetermined value with respect to the environmental map information M200 and M201, and in a case where there are a sufficient number of similar pairs, the map integration unit 169 generates the environmental map information M202 in which the mutually different environmental map information M200 and M201 are integrated based on the past self-locations at the time of acquisition of the similar pairs (from FIG. 20 to FIG. 21). Then, the map integration unit 169 updates the environmental map information stored in the environmental map information storage unit 191. Note that the map integration unit 169 may determine whether or not the sum of the similarity between the second feature amounts in all of the mutually different pieces of environmental map information is equal to or more than a certain threshold instead of evaluating the similarity in one image alone, and may integrate the mutually different pieces of environmental map information in a case where the sum is equal to or more than the threshold.

4-2. Action and Effect

According to the third embodiment described above, the map integration unit 169 integrates the plurality of pieces of environmental map information stored in the environmental map information storage unit 191 based on the second feature amount. Then, the first self-location estimation unit 161 and the second self-location estimation unit 164 estimate the first self-location and the second self-location using the integrated environmental map information. Furthermore, the data set generation unit 162 generates a learning data set using the integrated environmental map information, and the learning unit 163 performs machine learning from an image group having a severe environmental change. As a result, even in a severe environmental change, the stability and accuracy of the self-location can be improved as the autonomous mobile body 10 acts in the environment of the real space.

Furthermore, according to the third embodiment, by performing the machine learning, a feature amount optimal for location estimation in an activity environment of a robot can be extracted from an image, and a self-location of the autonomous mobile body 10 can be stably estimated with high accuracy.

According to the third embodiment, the map integration unit 169 integrates the plurality of pieces of environmental map information stored in the environmental map information storage unit 191 based on the second feature amount. Accordingly, it possible to prevent an increase in capacity even when different environmental map information is created each time even though there is a sufficient map for living in a certain space. As a result, since the number of pieces of the environmental map information is reduced, the self-location estimation device 16C can perform the self-location estimation processing in a short time.

4-3. Modification of Third Embodiment

Figure 24:
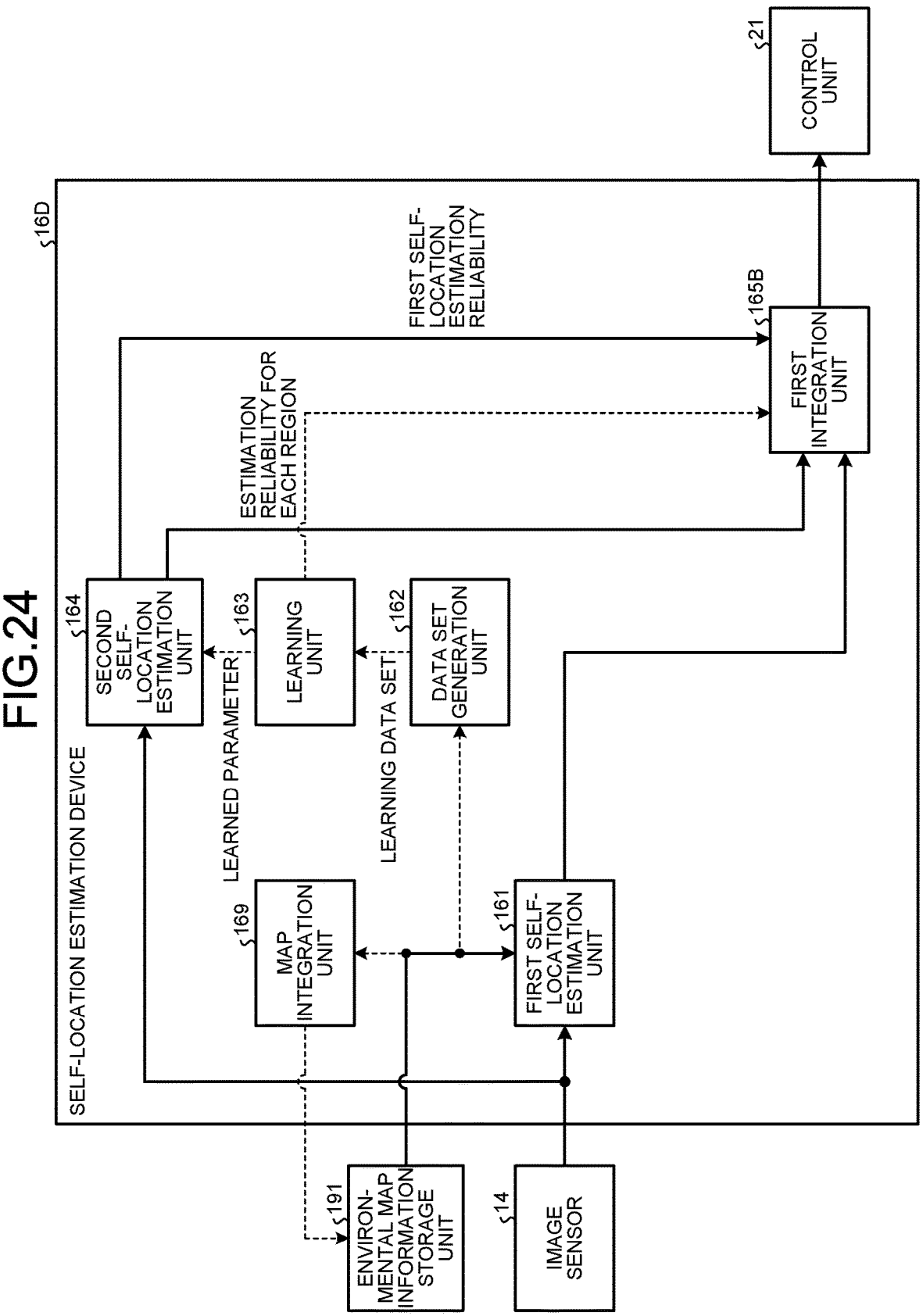
FIG. 24 is a block diagram illustrating a functional configuration of a self-location estimation device according to a modification of the third embodiment of the present disclosure.

Next, a modification of the third embodiment will be described. FIG. 24 is a block diagram illustrating a functional configuration of a self-location estimation device according to a modification of the third embodiment.

A self-location estimation device 16D illustrated in FIG. 24 is obtained by omitting the functions of the third self-location estimation unit 166, the weight calculation unit 167, and the second integration unit 168 from the configuration of the self-location estimation device 16C according to the third embodiment described above.

4-4. Action and Effect

According to the modification of the third embodiment described above, similarly to the third embodiment described above, even in a severe environment change, the stability and accuracy of the self-location can be improved as the autonomous mobile body 10 acts in the environment of the real space.

5. FOURTH EMBODIMENT

5-1. Functional Configuration of Self-Location Estimation Device

Figure 25:
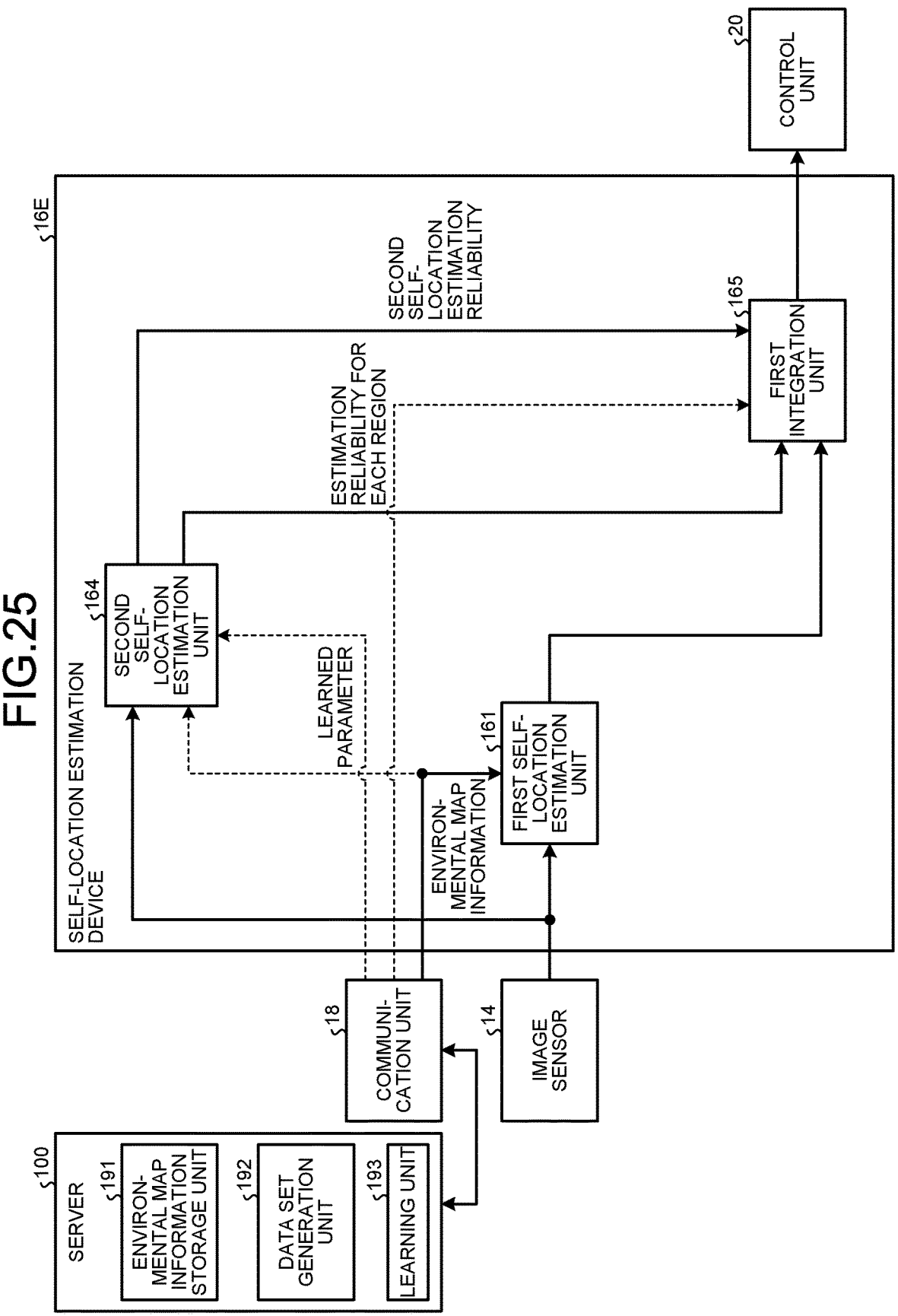
FIG. 25 is a block diagram illustrating a functional configuration of a self-location estimation device according to a fourth embodiment of the present disclosure.

Next, a fourth embodiment will be described. FIG. 25 is a block diagram illustrating a functional configuration of the self-location estimation device according to the fourth embodiment.

In a self-location estimation device 16E illustrated in FIG. 25, the data set generation unit 162 and the learning unit 163 are omitted from the configuration of the self-location estimation device 16 according to the first embodiment described above. The self-location estimation device 16E acquires various types of information from the server 100 via the communication unit 18 and the network.

The server 100 includes a memory and hardware such as a CPU. The server 100 includes the above-described environmental map information storage unit 191, data set generation unit 162, and learning unit 163. In response to a request from the autonomous mobile body 10 via the network, the server 100 transmits various types of information including the environmental map information stored in the environmental map information storage unit 191, the learned parameters, the estimation reliability for each region, and the like to the communication unit 18.

The self-location estimation device 16E configured as described above estimates the current self-location of the autonomous mobile body 10 by acquiring the environmental map information, the learned parameter, and the estimation reliability for each region from the server 100 via the communication unit 18.

5-2. Action and Effect

According to the fourth embodiment described above, since the self-location estimation device 16E can acquire various types of information from each of the environmental map information storage unit 191, the data set generation unit 162, and the learning unit 163 provided in the server 100, the device can be downsized.

6. CONCLUSION

In the first to fourth embodiments of the present disclosure described above, the self-location estimation device is provided in the autonomous mobile body. However, the self-location estimation device is not limited to this, and may be provided on a server, for example. In this case, the self-location estimation device may receive the image information acquired by the image sensor via the communication unit of the autonomous mobile body, estimate the self-location of the autonomous mobile body using the received image information, and transmit the estimation result to the autonomous mobile body.

Furthermore, various forms can be formed by appropriately combining a plurality of components disclosed in each of the autonomous mobile bodies and the self-location estimation devices according to the first to fourth embodiments of the present disclosure. For example, some components may be deleted from all the components described in the autonomous mobile bodies and the self-location estimation devices according to the first to fourth embodiments of the present disclosure described above. Furthermore, the components described in the autonomous mobile bodies and the self-location estimation devices according to the first to fourth embodiments of the present disclosure described above may be appropriately combined.

Furthermore, in the autonomous mobile body and the self-location estimation device according to the first to fourth embodiments of the present disclosure, the "unit" described above can be replaced with "means", "circuit", or the like. For example, the control unit can be replaced with a control means or a control circuit.

In addition, the programs executed by the autonomous mobile bodies and the self-location estimation devices according to the first to fourth embodiments of the present disclosure are provided by being recorded in a computer-readable recording medium such as a CD-ROM, a flexible disk (FD), a CD-R, a digital versatile disk (DVD), a USB medium, or a flash memory as file data in an installable format or an executable format.

Furthermore, the programs executed by the autonomous mobile bodies and the self-location estimation devices according to the first to fourth embodiments of the present disclosure may be stored in a computer connected to a network such as the Internet and provided by being downloaded via the network.

Note that, in the description of the timing chart in the present specification, the context of processing between timings is clearly indicated using expressions such as "first", "after", and "subsequently", but the order of processing necessary for implementing the present disclosure is not uniquely determined by these expressions. That is, the order of processing in the timing chart described in the present specification can be changed within a range without inconsistency.

Note that the effects described in the present specification are merely examples and are not limited, and other effects may be provided.

Note that the present technology can also have the following configurations.

(1)

A self-location estimation device comprising:

a first self-location estimation unit that estimates a current first self-location of an autonomous mobile body based on current image information acquired by one or more image sensors provided in the autonomous mobile body movable in a real space and environmental map information in which pieces of past image information acquired in the past by the image sensor, one or more feature amounts extracted from the past image information, and pairs of past self-locations at which a location of the autonomous mobile body is estimated at an acquisition time when the image sensor acquires the past image information are associated in plural on a map;

a second self-location estimation unit that estimates a current second self-location of the autonomous mobile body based on the current image information acquired by the image sensor and a learned parameter learned using the environmental map information; and a first integration unit that estimates a current self-location of the autonomous mobile body by integrating the first self-location and the second self-location.

(2)

The self-location estimation device according to (1), further comprising:

a data set generation unit that generates a learning data set based on the environmental map information; and a learning unit that uses the learning data set generated by the data set generation unit as an input and calculates the learned parameter and estimation reliability of each of a plurality of regions on the map, wherein the second self-location estimation unit outputs the second self-location and second self-location estimation reliability when the second self-location is estimated based on the current image information acquired by the image sensor and the learned parameter calculated by the learning unit, and the first integration unit estimates a current self-location of the autonomous mobile body by integrating the first self-location and the second self-location based on at least one of the estimation reliability of each of the plurality of regions and the second self-location estimation reliability.

(3)

The self-location estimation device according to (2), wherein the data set generation unit classifies the plurality of pairs into one or a plurality of groups, sets a reference self-location to be a reference for each group, obtains, for each group, offset information indicating an offset amount between the reference self-location and the past self-location for each pair, sets an input portion of the learning data set as the past image information of the pair, and generates the learning data set in which an output portion of the learning data set is set to group information related to the group including the pair and the offset information.

(4)

The self-location estimation device according to (2) or (3), wherein the data set generation unit determines whether or not a property of the past image information among a plurality of the pairs in the environmental map information is within an allowable range, and excludes the feature amount associated with the past image information of the pair not within the allowable range and the past self-location from the learning data set.

(5)

The self-location estimation device according to any one of (1) to (4), further comprising:

a third self-location estimation unit that estimates a current third self-location based on odometry information of the autonomous mobile body;

a weight calculation unit that calculates a weight coefficient to be multiplied by the first self-location based on a self-location estimation reliability of the first self-location; and a second integration unit that integrates the first self-location and the third self-location based on the weight coefficient calculated by the weight calculation unit, wherein the first integration unit estimates the current self-location of the autonomous mobile body by integrating an integration result integrated by the second integration unit and the second self-location.

(6)

The self-location estimation device according to any one of (1) to (5), further comprising:

an environmental map information storage unit that stores a plurality of pieces of the environmental map information; and a map integration unit that integrates the plurality of pieces of environmental map information stored in the environmental map information storage unit, wherein the feature amount includes a first feature amount extracted by a first feature amount extraction method, and a second feature amount extracted by a second feature amount extraction method different from the first feature amount extraction method, the environmental map information storage unit stores a plurality of the pairs having different relative locational relationships among the plurality of pairs as different pieces of the environmental map information, and the map integration unit includes integrates the different pieces of environmental map information based on the second feature amount.

(7)

The self-location estimation device according to (6), wherein the first self-location estimation unit estimates the first self-location based on the past image information, the first feature amount, the past self-location, and the current image information in the environmental map information, the map integration unit determines whether or not the environmental map information storage unit stores a plurality of pieces of the environmental map information, and when it is determined that the environmental map information storage unit stores the plurality of pieces of environmental map information, the map integration unit estimates similarity between the pairs of the pieces of the past image information included in the different pieces of the environmental map information, the first feature amounts, the second feature amounts, and the past self-location using the second feature amount, counts the number of pairs having similarity equal to or more than a predetermined threshold in the different pieces of the environmental map information, and integrates the different pieces of environmental map information based on the past self-location of the pair of which the similarity is equal to or more than a predetermined threshold when the number of pairs is equal to or more than a predetermined value.

(8)

The self-location estimation device according to (6) or (7), wherein the second feature amount includes one or more of a size, a location, a type, and a direction of an object detected by performing multi-object detection processing on the past image information.

(9)

An autonomous mobile body comprising:
a self-location estimation device;
one or more image sensors;
a movement mechanism; and
a control unit that controls the movement mechanism,
wherein the self-location estimation device includes
a first self-location estimation unit that estimates a current first self-location of an autonomous mobile body based on current image information acquired by the image sensors and environmental map information in which pieces of past image information acquired in the past by the image sensor, one or more feature amounts extracted from the past image information, and pairs of past self-locations at which a location of the autonomous mobile body is estimated at an acquisition time when the image sensor acquires the past image information are associated in plural on a map,
a second self-location estimation unit that estimates a current second self-location of the autonomous mobile body based on the current image information acquired by the image sensor and a learned parameter learned using the environmental map information, a first integration unit that estimates a current self-location of the autonomous mobile body by integrating the first self-location and the second self-location,
a data set generation unit that generates a learning data set based on the environmental map information, and
a learning unit that uses the learning data set generated by the data set generation unit as an input and calculates the learned parameter and estimation reliability of each of a plurality of regions on the map,
the second self-location estimation unit outputs the second self-location and second estimation result reliability when the second self-location is estimated based on the current image information acquired by the image sensor and the learned parameter calculated by the learning unit,
the first integration unit estimates a current self-location of the autonomous mobile body by integrating the first self-location and the second self-location based on at least one of the estimation reliability of each of the plurality of regions and the second estimation result reliability, and
the control unit preferentially moves the autonomous mobile body to a region having low estimation reliability for each of the plurality of regions by driving the movement mechanism based on the current self-location estimated by the first integration unit.

(10)

The autonomous mobile body according to (9), further comprising an environmental map information storage unit that stores the plurality of pieces of environmental map information.

(11)

An autonomous mobile body comprising:
a self-location estimation device;
one or more image sensors;
a communication unit that bidirectionally communicates with an external server;
a movement mechanism;
a control unit that controls the communication unit and the movement mechanism; and
wherein the self-location estimation device includes
a first self-location estimation unit that estimates a current first self-location of an autonomous mobile body based on current image information acquired by the image sensors and environmental map information in which pieces of past image information acquired in the past by the image sensor, one or more feature amounts extracted from the past image information, and pairs of past self-locations at which a location of the autonomous mobile body is estimated at an acquisition time when the image sensor acquires the past image information are associated in plural on a map,
a second self-location estimation unit that estimates a current second self-location of the autonomous mobile body based on the current image information acquired by the image sensor and a learned parameter learned using the environmental map information, and
a first integration unit that estimates a current self-location of the autonomous mobile body by integrating the first self-location and the second self-location,
the server includes
an environmental map information storage unit that stores a plurality of pieces of the environmental map information,
a data set generation unit that generates a learning data set based on the environmental map information, and
a learning unit that uses the learning data set generated by the data set generation unit as an input and calculates the learned parameter and estimation reliability of each of a plurality of regions on the map, the control unit causes the communication unit to acquire the environmental map information and the learned parameter calculated by the learning unit, the second self-location estimation unit outputs the second self-location and second estimation result reliability when the second self-location is estimated based on the current image information acquired by the image sensor and the learned parameter calculated by the learning unit, and the first integration unit estimates a current self-location of the autonomous mobile body by integrating the first self-location and the second self-location based on at least one of the estimation reliability of each of the plurality of regions and the second estimation result reliability.

(12)

The autonomous mobile body according to (11), wherein the control unit preferentially moves the autonomous mobile body to a region having low estimation reliability for each of the plurality of regions by driving the movement mechanism based on the current self-location estimated by the first integration unit.

(13)

A self-location estimation method executed by a self-location estimation device, the method comprising:

estimating a current first self-location of an autonomous mobile body based on current image information acquired by one or more image sensors provided in the autonomous mobile body movable in a real space and environmental map information in which pieces of past image information acquired in the past by the image sensor, one or more feature amounts extracted from the past image information, and pairs of past self-locations at which a location of the autonomous mobile body is estimated at an acquisition time when the image sensor acquires the past image information are associated in plural on a map;

estimating a current second self-location of the autonomous mobile body based on the current image information acquired by the image sensor and a learned parameter learned using the environmental map information; and estimating a current self-location of the autonomous mobile body by integrating the first self-location and the second self-location.

(14)

A program to be executed by a self-location estimation device, the program comprising:

estimating a current first self-location of an autonomous mobile body based on current image information acquired by one or more image sensors provided in the autonomous mobile body movable in a real space and environmental map information in which pieces of past image information acquired in the past by the image sensor stored in environmental map information storage unit, one or more feature amounts extracted from the past image information, and pairs of past self-locations at which a location of the autonomous mobile body is estimated at an acquisition time when the image sensor acquires the past image information are associated in plural on a map;

estimating a current second self-location of the autonomous mobile body based on the current image information acquired by the image sensor and a learned parameter learned using the environmental map information; and estimating a current self-location of the autonomous mobile body by integrating the first self-location and the second self-location.

REFERENCE SIGNS LIST

10 AUTONOMOUS MOBILE BODY
11 HEAD PORTION
12 BODY PORTION
13 MOVEMENT MECHANISM
14 IMAGE SENSOR
15 INTERNAL SENSOR
16, 16A to 16E SELF-LOCATION ESTIMATION DEVICE
17 EXTERNAL SENSOR
18 COMMUNICATION UNIT
19 STORAGE UNIT
20 CONTROL UNIT
100 SERVER
161 FIRST SELF-LOCATION ESTIMATION UNIT
161a FEATURE AMOUNT EXTRACTION UNIT
161b COLLATION UNIT
162 DATA SET GENERATION UNIT
163 LEARNING UNIT
164 SECOND SELF-LOCATION ESTIMATION UNIT
165, 165A, 165B FIRST INTEGRATION UNIT
166 THIRD SELF-LOCATION ESTIMATION UNIT
167 WEIGHT CALCULATION UNIT
168 SECOND INTEGRATION UNIT
169 MAP INTEGRATION UNIT
191 ENVIRONMENTAL MAP INFORMATION STORAGE UNIT
192 PROGRAM STORAGE UNIT
D1, D2 LEARNING DATA SET

The invention claimed is:

1. A self-location estimation device, comprising:
a central processing unit (CPU) configured to:
receive current image information from one or more image sensors of an autonomous mobile body, wherein the autonomous mobile body is movable in a real space;
estimate a current first self-location of the autonomous mobile body based on the current image information and environmental map information, wherein
the environmental map information includes a plurality of pairs of past image information acquired in past by the one or more image sensors, feature data of the plurality of pairs of the past image information, and a past self-location of the autonomous mobile body at a time of the acquisition of each of the plurality of pairs of the past image information,
the plurality of pairs of the past image information, the feature data, and the past self-location of each of the plurality of pairs of the past image information are associated on a map in the environmental map information, and
the feature data corresponds to feature points of the plurality of pairs of the past image information;
estimate a current second self-location of the autonomous mobile body based on the current image information and a learned parameter, wherein the learned parameter is based on the environmental map information; and
integrate the current first self-location and the current second self-location to estimate a third current self-location of the autonomous mobile body.

2. The self-location estimation device according to claim 1, wherein the CPU is further configured to:
generate a learning data set based on the environmental map information;

calculate, based on the learning data set, the learned parameter and specific estimation reliability of each of a plurality of regions on the map;

output each of the current second self-location and a self-location estimation reliability based on the estimation of the current second self-location and the learned parameter; and estimate the third current self-location of the autonomous mobile body based on at least one of the specific estimation reliability of each of the plurality of regions or the self-location estimation reliability.

3. The self-location estimation device according to claim 2, wherein the CPU is further configured to:

classify the plurality of pairs of the past image information into a plurality of groups;

set a reference self-location as a reference for each of the plurality of groups;

obtain, for each group of the plurality of groups, offset information that indicates an offset amount between the reference self-location and the past self-location for each pair of the plurality of pairs of the past image information;

set an input portion of the learning data set as the past image information of each pair of the plurality of pairs of the past image information; and generate the learning data set in which an output portion of the learning data set is a list of each of the plurality of groups, wherein each of the plurality of groups includes each of the plurality of pairs of the past image information, group information related to each of the plurality of groups, and the offset information.

4. The self-location estimation device according to claim 2, wherein the CPU is further configured to:

determine whether meta-information of the plurality of pairs of the past image information is within an allowable range; and exclude the feature data associated with a pair of the past image information from the plurality of pairs of the past image information in a case where the meta-information associated with the pair of the past information is not within the allowable range.

5. The self-location estimation device according to claim 1, wherein the CPU is further configured to:

estimate a current fourth self-location based on odometry information of the autonomous mobile body;

calculate a weight coefficient that is multiplied by the current first self-location based on a self-location estimation reliability of the current first self-location;

integrate the current first self-location and the current fourth self-location based on the weight coefficient; and estimate the third current self-location of the autonomous mobile body based on integration of an integration result of the current first self-location and the current fourth self-location with the current second self-location.

6. The self-location estimation device according to claim 1, wherein the CPU is further configured to:

control a memory to store a plurality of different pieces of the environmental map information, wherein the plurality of different pieces has different relative locational relationships;

extract first feature data of the feature data from the past image information by a first method;

extract second feature data of the feature data from the past image information by a second method different from the first method; and integrate the plurality of different pieces of the environmental map information based on the second feature data.

7. The self-location estimation device according to claim 6, wherein the CPU is further configured to:

estimate the current first self-location based on the plurality of pairs of the past image information, the first feature data, the past self-location, and the current image information;

determine that the memory stores the plurality of different pieces of the environmental map information;

estimate similarity between the plurality of pairs of the past image information in the different pieces of the environmental map information, the first feature data, the second feature data, and the past self-location;

count a number of pairs, having similarity equal to or more than a threshold, in the plurality of different pieces of the environmental map information; and integrate the plurality of different pieces of the environmental map information based on the past self-location of the number of pairs of which the similarity is equal to or more than the threshold, and the number of pairs is equal to or more than a determined value.

8. The self-location estimation device according to claim 6, wherein the CPU is further configured to execute a multi-object detection process on the past image information to detect the second feature data, and wherein the second feature data includes at least one of a size, a location, a type, or a direction of an object.

9. The autonomous mobile body according to claim 4, wherein the meta-information corresponds to at least one of data capacity, image quality, image acquisition date, image acquisition time, identification information of the autonomous mobile body, photographing information, or noise information, and the photographing information includes at least one of ISO, shutter speed, or F-number.

10. A self-location estimation method comprising:

in a self-location estimation device:

receiving current image information from one or more image sensors of an autonomous mobile body, wherein the autonomous mobile body is movable in a real space;

estimating a current first self-location of the autonomous mobile body based on the current image information and environmental map information, wherein the environmental map information includes a plurality of pairs of past image information acquired in past by the one or more image sensors, feature data of the plurality of pairs of the past image information, and a past self-location of the autonomous mobile body at a time of the acquisition of each of the plurality of pairs of the past image information, the plurality of pairs of the past image information, the feature data, and the past self-location of each of the plurality of pairs of the past image information are associated on a map in the environmental map information, and the feature data corresponds to feature points of the plurality of pairs of the past image information;

estimating a current second self-location of the autonomous mobile body based on the current image information and a learned parameter, wherein the learned parameter is based on the environmental map information; and integrating the current first self-location and the current second self-location to estimate a third current self-location of the autonomous mobile body.

11. A non-transitory computer-readable medium having stored thereon, computer-executable instructions, which when executed by a processor, cause the processor to execute operations, the operations comprising:

receiving current image information from one or more image sensors of an autonomous mobile body, wherein the autonomous mobile body is movable in a real space;

estimating a current first self-location of the autonomous mobile body based on the current image information and environmental map information, wherein the environmental map information includes a plurality of pairs of past image information acquired in past by the one or more image sensors, feature data of the plurality of pairs of the past image information, and a past self-location of the autonomous mobile body at a time of the acquisition of each of the plurality of pairs of the past image information, the plurality of pairs of the past image information, the feature data, and the past self-location of each of the plurality of pairs of the past image information are associated on a map in the environmental map information, and the feature data corresponds to feature points of the plurality of pairs of the past image information;

estimating a current second self-location of the autonomous mobile body based on the current image information and a learned parameter, wherein the learned parameter is based on the environmental map information; and integrating the current first self-location and the current second self-location to estimate a third current self-location of the autonomous mobile body.

* * * * *